(12) United States Patent
Shiraishi et al.

(10) Patent No.: US 6,564,763 B2
(45) Date of Patent: *May 20, 2003

(54) INTERNAL COMBUSTION ENGINE CONTROL SYSTEM

(75) Inventors: Takuya Shiraishi, Hitachinaka (JP); Minoru Ohsuga, Hitachinaka (JP); Mamoru Fujieda, Tomobe-machi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/163,496

(22) Filed: Jun. 7, 2002

(65) Prior Publication Data

US 2002/0148422 A1 Oct. 17, 2002

Related U.S. Application Data

(63) Continuation of application No. 09/968,939, filed on Oct. 3, 2001, now abandoned, which is a continuation of application No. 09/515,511, filed on Feb. 29, 2000, now abandoned, which is a continuation of application No. 09/051,071, filed as application No. PCT/JP95/02005 on Oct. 2, 1995, now Pat. No. 6,055,948.

(51) Int. Cl.[7] ............................. F01L 1/34; F02M 51/00
(52) U.S. Cl. ..................... 123/90.15; 123/478
(58) Field of Search ................. 123/90.15, 90.16, 123/294, 305, 478, 559.1; 60/285

(56) References Cited

U.S. PATENT DOCUMENTS

| | | | | |
|---|---|---|---|---|
| 4,957,088 A | * | 9/1990 | Hosaka | 123/480 |
| 5,009,203 A | * | 4/1991 | Seki | 123/90.16 |
| 5,024,191 A | * | 6/1991 | Nagahiro et al. | 123/198 D |
| 5,031,595 A | * | 7/1991 | Heck et al. | 123/339 |
| 5,123,397 A | * | 6/1992 | Richeson | 123/568 |
| 5,237,968 A | * | 8/1993 | Miller et al. | 123/90.11 |
| 5,365,908 A | * | 11/1994 | Takii et al. | 123/564 |
| 5,398,502 A | * | 3/1995 | Watanabe | 60/284 |
| 5,427,078 A | * | 6/1995 | Hitomi et al. | 123/559 |
| 5,494,008 A | * | 2/1996 | Ohkawa et al. | 123/90.17 |
| 5,495,830 A | * | 3/1996 | Wu | 123/90.15 |
| 5,694,912 A | * | 12/1997 | Gotou et al. | 123/674 |
| 5,724,927 A | * | 3/1998 | Suzuki | 123/90.15 |

* cited by examiner

*Primary Examiner*—Henry C. Yuen
*Assistant Examiner*—Mahmoud Gimie
(74) *Attorney, Agent, or Firm*—Crowell & Moring LLP

(57) ABSTRACT

In an internal combustion engine control system for controlling an internal combustion engine, comprising a fuel injection control means for controlling fuel injection quantity to be injected by a fuel supply system for supplying fuel to the internal combustion engine, and fuel injection timing, and a variable valve control means for continuously or gradually varying at least opening timing, closing timing or lift of a intake valve or an exhaust valve for sealing up a combustion chamber of the internal combustion engine, the fuel injection control means controls at least fuel injection quantity or fuel injection timing on the basis of a value of a controlled variable provided by the variable valve control means. Since air quantity can be regulated by a variable valve timing mechanism, pumping loss and fuel consumption can be reduced. Fuel injected into the combustion chamber can be atomized by opening the intake valve so that a shock wave is generated in the combustion chamber and, consequently, stable combustion can be achieved without deteriorating the quality of the exhaust gas.

22 Claims, 18 Drawing Sheets

INTERNAL COMBUSTION ENGINE CONTROL SYSTEM

This application is a continuation of application Ser. No. 09/968,939, filed Oct. 3, 2001 now abandoned; which is a continuation of application Ser. No. 09/515,511, filed Feb. 29, 2000 now abandoned; which is a continuation of application Ser. No. 09/051,071; filed Apr. 2, 1998, now U.S. Pat. No. 6,055,948, issued May 2, 2000; which is a 371 of PCT/JP95/02005, filed Oct. 2, 1995.

TECHNICAL FIELD

The present invention relates to an internal combustion engine control system for controlling an internal combustion engine and, more particularly, to an internal combustion engine control system for controlling intake air and fuel in an internal combustion engine.

BACKGROUND ART

Generally, the timing of operations of the intake valve and the exhaust valve of engines including direct fuel injection engines is dependent only on the cam profiles of cams driven for rotation in synchronism with the rotation of the crankshaft of the engine. Accordingly, it is difficult to achieve optimum valve timing control in a wide range of operating condition. It is desirable to vary valve timing according to the operating condition to improve the output performance of the engine and the like. It is necessary to vary valve timing so that valve overlap period, i.e., a period in which both the intake and the exhaust valve are open, decreases to prevent the blowby of new charge while the engine is operating at a relatively low engine speed, and so that valve overlap period increases to supply new charge at a high charging efficiency by using exhaust gas pulsation while the engine is operating at a relatively high engine speed.

A technique relating to such a mode of control of valve timing is disclosed in JP-A No. 6-101508. This prior art technique controls negative pressure in the intake pipe minutely at an optimum value, and controls the timing of closing the intake valve on the basis of parameters indicating the operating condition of the engine including cooling water temperature, intake air temperature and time-dependent changes in the engine in addition to a map showing a function of engine speed and load to reduce pumping loss.

In an engine which is provided with a throttle valve disposed before an intake system to regulate the quantity of intake air and regulates the quantity of fuel to be injected according to the quantity of intake air, the pressure in the intake pipe is lower than the atmospheric pressure in an operating range in which the load on the engine is relatively low, energy necessary for lowering the piston, i.e., energy necessary to achieve a suction stroke (pumping loss) increases, the ratio of pumping loss to engine output increases and fuel consumption increases.

The prior art technique, however, keeps the lift of the intake valve and the opening angle fixed and does not control the same. Therefore, the quantity of intake air to be sucked into the combustion chamber of the engine must be controlled by a throttle valve or the like disposed above the intake valve Therefore, a negative pressure prevails in the intake passage below the throttle valve and in the combustion chamber, causing pumping loss. Accordingly, this prior art technique is not fully satisfactory as regards the reduction of pumping loss and fuel consumption.

In a direct fuel injection engine in which the fuel is injected directly into the combustion chamber, fuel injection timing is set so that the fuel is injected in a period during the suction stroke and the compression stroke in which the exhaust valve is closed to avoid discharging the unburned fuel. Consequently, time available for the evaporation of the fuel, i.e., time from fuel injection to ignition, is short. Therefore, the fuel must be injected through a fuel injector in small particles to promote the evaporation of the fuel and the mixing of the fuel with air. As is generally known, the higher the fuel injection pressure, the smaller is the particle size of the fuel. Therefore, the fuel is pressurized at a very high pressure of about 5 MPa. However, the fuel injected at a high injection pressure has a very high spray penetration, impinges on the inner surface of the cylinder and the top of the piston, and part of the fuel adheres to the inner surface of the cylinder. The fuel adhering to the inner surface of the cylinder is exhausted without burning to increase the HC (hydrocarbon) content of the exhaust gas. The fuel injector for the direct fuel injection engine is required to inject the fuel in fine particles and to reduce the spray penetration in order that the foregoing problems are solved.

DISCLOSURE OF INVENTION

It is an objective of the present invention to provide an internal combustion engine control system for controlling an internal combustion engine, capable of greatly reducing pumping loss while the engine is operating in a low-load range, of reducing fuel consumption, and of enabling satisfactory combustion without adversely affecting exhaust performance.

The foregoing objective is achieved by an internal combustion engine control system according to one aspect of the present invention for controlling an internal combustion engine, comprising: a fuel injection control means for controlling fuel injection quantity to be injected by a fuel supply system for supplying fuel to the internal combustion engine, and fuel injection timing; and a variable valve control means for continuously or gradually varying at least opening timing, closing timing or lift of a intake valve or an exhaust valve for sealing up a combustion chamber of the internal combustion engine; wherein the fuel injection control means controls at least fuel injection quantity or fuel injection timing on the basis of a value of a controlled variable provided by the variable valve control means.

The foregoing objective can be achieved by an internal combustion engine control system according to another aspect of the present invention for controlling an internal combustion engine, comprising: a fuel injection control means for controlling fuel injection quantity to be injected by a fuel injection system for directly injecting the fuel into a combustion chamber of the internal combustion engine, and fuel injection timing; and a variable valve control means for continuously or gradually varying at least opening timing, closing timing or lift of a intake valve or an exhaust valve for sealing up the combustion chamber of the internal combustion engine; wherein the fuel injection control means controls at least fuel injection quantity or fuel injection timing on the basis of a value of a controlled variable provided by the variable valve control means.

The controller of the foregoing construction exercises the following actions and effects. The variable valve control means regulates the opening timing, the closing timing and the lift of the intake valve and the exhaust valve to reduce pumping loss and fuel consumption while the engine is operating in a low-load operation range. The variable valve control means regulates the opening timing, the closing timing and the lift of the intake valve and the exhaust valve to increase charging efficiency and to enhance the output power of the engine while the engine is operating in a high-load operation range. The fuel injection control means controls fuel injection quantity and fuel injection timing according to changes in the variable valve control means to inject the fuel into the combustion chamber in satisfactory particles to enable stable combustion and to reduce the hydrocarbon concentration of the exhaust gas.

BEST MODE FOR CARRYING OUT INVENTION

Figure 1:
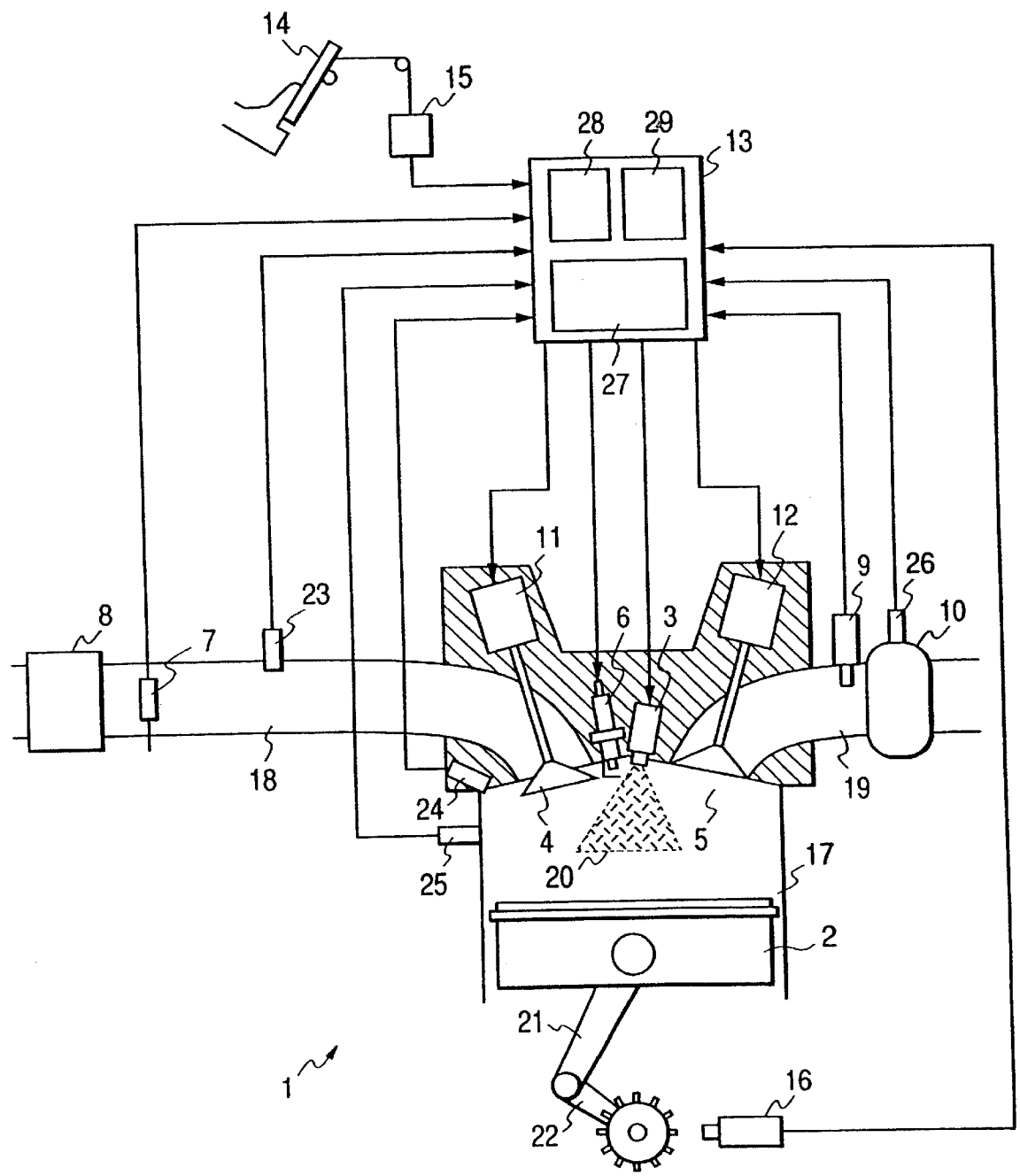
FIG. 1 is a typical view illustrating the configuration of a first embodiment of the present invention.

FIG. 1 is a view showing the configuration of a first embodiment of the present invention and illustrating one of the cylinders of an engine in a sectional view. Referring to FIG. 1, an engine 1 is provided with a piston 2, a fuel injector 3, a intake valve 4, an exhaust valve 5, an ignition plug 6, a combustion chamber pressure sensor 24 for sensing pressure in a combustion chamber, and a knocking sensor 25. A intake pipe 18 is provided with an air flow sensor 7, an air cleaner 8 and a intake pipe pressure sensor 23 for sensing pressure in the intake pipe 18. An exhaust pipe 19 is provided with an air/fuel ratio sensor 9, a catalytic unit 10, and a catalyst temperature sensor 26 for sensing catalyst temperature, i.e., the temperature of the catalytic unit 10. Signals provided by the air flow sensor 7, the intake pipe pressure sensor 23, the combustion chamber pressure sensor 24, the knocking sensor 25, the air/fuel ratio sensor 9, the catalyst temperature sensor 26 and a crank angle sensor 16 are given to an engine controller 13. An operating mode detecting unit 27 detects an operating mode of the engine 1 on the basis of the signals received by the engine controller 13. A variable valve control unit 28 generates control signals for controlling the timing of operations of the suction valve 4 and the exhaust valve 5 and the lift of the suction valve 4 and the exhaust valve 5 on the basis of the result of determination made by the operating mode detecting unit 27 and gives the same to variable valve timing mechanisms 11 and 12 to control the intake valve 4 and the exhaust valve 5. A fuel injection control unit 29 generates control signals specifying a fuel injection quantity and fuel injection timing on the basis of the control signals provided by the operating mode detecting unit 27 and the variable valve timing control unit 28 to control the fuel injector 3. The fuel injector valve 3 operates according to the control signal given thereto by the fuel injection control unit 29 to inject the fuel 20 into a combustion chamber 17. An ignition control unit, not shown, generates an ignition signal on the basis of the control signals provided by the operating mode detecting unit 27, the variable valve control unit 28 and the fuel injection control unit 29 to drive the ignition plug for ignition to cause the combustion of the mixture in the combustion chamber 17 of the engine 1.

When the engine 1 is in a suction stroke, in which the piston is moving from the top dead center toward the bottom dead center, the intake valve 4 is operated for an opening operation by the variable valve timing mechanism 11 for the intake valve 4. In this state, air flowing through the air cleaner 8 and the air flow sensor 7 is sucked into the engine 1. The engine 1 is not provided with any throttle valve and the quantity of intake air is controlled by the intake valve. The variable valve timing mechanism 11 keeps the intake valve 4 closed while the piston 2 is moving near the bottom dead center. The piston 2 moves upward to compress the combustion chamber 17. If the engine 1 is a direct fuel injection engine, the fuel injector valve 3 injects the fuel 20 into the combustion chamber 17 while the engine 1 is in a suction stroke and a compression stroke. The injected fuel 20 mixes with air in the combustion chamber 17, is compressed by the piston 2, and is ignited by the ignition plug 6 for combustion. The piston 2 is caused to move downward by a high pressure generated by the combustion of the fuel. The movement of the piston 2 is transmitted through a connecting rod 21 to a crankshaft 22 to make the engine provide power through the crankshaft 22. Subsequently, the variable valve timing mechanism 12 for the exhaust valve 5 opens the exhaust valve 5 upon the arrival of the piston 2 moved by the expansion of a high-temperature combustion gas at a position near the bottom dead center to discharge the combustion gas from the combustion chamber 17. Then, the piston 2 moves from the bottom dead center to the top dead center to push out the gas staying in the combustion chamber 17.

The engine controller 13 determines the operating condition of the engine 1 on the basis of the engine speed of the engine 1, the intake air quantity, the stepping-on measurement of an accelerator pedal 14, the suction pipe pressure, i.e., the pressure in the intake pipe, the combustion chamber pressure, i.e., the pressure in the combustion chamber 17, a combustion mode with or without knocking, the air/fuel ratio and the catalyst temperature, i.e., the temperature of the catalytic unit. The engine speed of the engine 1 is measured by the crank angle sensor 16 attached to an end of the crankshaft 22, the quantity of intake air is measured by the air flow sensor 7 disposed in the intake pipe 18, the stepping-on measurement of the accelerator pedal 14 is measured by a potentiometer 15 connected to the accelerator pedal 14, the pressure in the intake pipe is measured by the intake pipe pressure sensor 23 disposed in the intake pipe 18, the pressure in the combustion chamber is measured by the combustion chamber pressure sensor 24 disposed in the combustion chamber 17, the knocking operation of the engine 1 is detected by the knocking sensor 25 disposed near the combustion chamber 17, the air/fuel ratio is measured by the air/fuel ratio sensor 9 disposed in the exhaust pipe 19, the temperature of the catalytic unit is measured by the catalyst temperature sensor 26 attached to the catalytic unit, and the temperature of cooling water is measured by a water temperature sensor, not shown.

Figure 2:
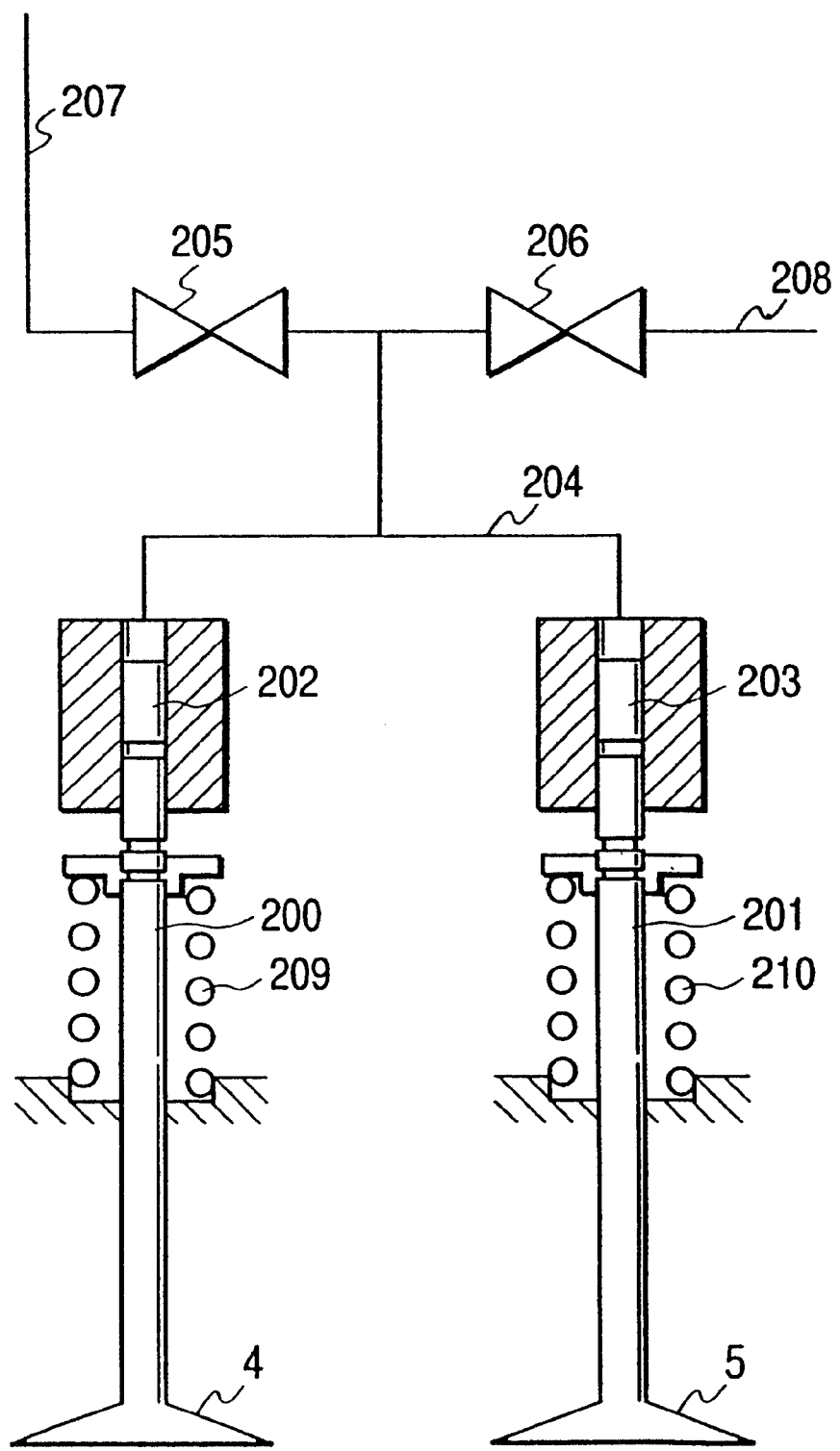
FIG. 2 is a typical view of assistance in explaining a variable valve timing mechanism according to the present invention.

The variable valve timing mechanisms of the present invention are of a direct hydraulic drive system as shown in FIG. 2. Pistons 202 and 203 are in contact respectively with a intake valve stem 200 and an exhaust valve stem 201. Two selector valves 205 and 206 for valve opening control and valve closing control are disposed in a line 204 connected to the pistons 202 and 203. When opening the intake valve 4 and the exhaust valve 5, the selector valve 205 is opened by supplying a high-pressure working fluid through a line 207 to the pistons 202 and 203. After the intake valve 4 and the exhaust valve 5 have been lifted by predetermined valve lifts, the selector valve 205 is closed to seal the working fluid in a portion of the line on the side of the pistons 202 and 203 so that the valves 4 and 5 are held at the predetermined valve lifts. When closing the valves 4 and 5, the selector valve 206 is opened to discharge the working fluid sealed in the portion of the line on the side of the pistons 202 and 203 to flow through a drain line 208 so that the valves are closed by valve springs 209 and 210. The valves may be directly driven by electromagnetic forces.

Figure 3:
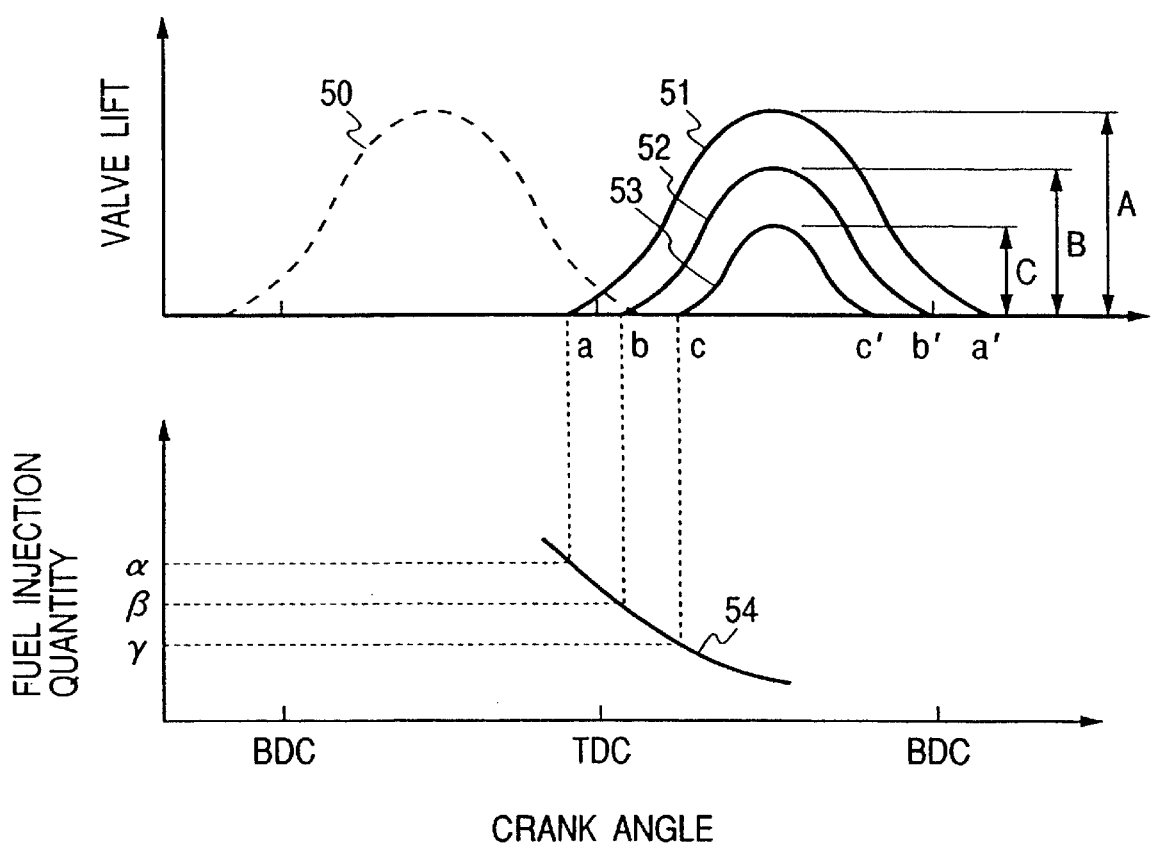
FIG. 3 is a graph showing the relation between valve lift and fuel injection quantity in the first embodiment.

FIG. 3 is a graph showing the relation between the valve lifts of the intake valve 4 and the exhaust valve 5, and fuel injection quantity in the first embodiment of the present invention. The engine controller 13 determines timing for opening the intake valve 4, timing for closing the intake valve 4 and a lift by which the intake valve 4 is lifted. When the engine 1 is operating at a high engine speed under a high load, the intake valve 4 starts opening before the piston reaches the top dead center TDC and the crankshaft is at a crank angle a so that an open state of the intake valve 4 and an open state of the exhaust valve 5 indicated by a valve lift curve 50 overlap greatly, and the intake valve 4 is lifted by a large lift A to increase the quantity of intake air. Timing for closing the intake valve 4 is determined so that the intake valve 4 is closed at a crank angle a' after the bottom dead center BDC for the utmost utilization of the effect of inertia supercharging. When the engine 1 is operating under a low load, the intake valve 4 is opened at a crank angle c corresponding to a position of the piston after the top dead center to prevent discharging a new charge taken into the stepping-on measurement through the intake valve 4 through the exhaust valve 5, the intake valve 4 is closed at a crank angle corresponding to a position of the piston before the bottom dead center to shorten valve opening period, and the intake valve 4 is lifted by a small lift C to reduce the quantity of intake air. The intake valve 4 can be opened at a crank angle b, can be lifted by a lift B and can be closed at a crank angle b' by continuously varying the opening timing for opening the intake valve 4, the closing timing for closing the intake valve 4 and the lift of the intake valve 4.

Fuel injection timing is determined so as to be synchronized with opening timing for opening the intake valve 4 and the closing timing for closing the intake valve 4. In the embodiment shown in FIG. 3, the fuel is injected in synchronism with the opening of the intake valve 4. When the fuel is thus injected into the combustion chamber, fuel droplets injected into the combustion chamber immediately after the opening of the intake valve 4 and flying in the combustion chamber are torn off, blown and atomized by rapid air currents flowing into the combustion chamber immediately after the opening of the intake valve 4. The atomized fuel is mixed satisfactorily with air in the combustion chamber to produce a mixture which can be easily ignited, so that the mixture ignites surely, misfire does not occur and stable combustion is achieved. In the direct fuel injection engine, the fuel is liable to adhere in a liquid state to portions of the engine around the fuel injector, the fuel adhering to walls in a liquid state does not mix with air satisfactorily, and hence misfire or abnormal combustion is liable to occur. The rapid air currents exerts an effect of separating the liquid fuel from the wall to improve combustion.

The fuel injection quantity is dependent on the valve lift of the intake valve 4. A large quantity of air is sucked and hence the fuel injection quantity is $\alpha$ and the intake valve 4 is opened at a crank angle a if the intake valve 4 is opened in a mode represented by a curve 51. A small quantity of air is sucked and hence the fuel injection quantity is and the intake valve 4 is opened at a crank angle c if the intake valve 4 is opened in a mode represented by a curve 53. If the timing of opening the intake valve 4, the valve lift and the timing of closing the intake valve 4 are varied continuously and intermediate conditions (a intake valve opening crank angle b, a valve lift B, and a intake valve closing crank angle b') are selected, a fuel injection quantity is $\beta$ and the intake valve 4 is opened at a crank angle b.

Figure 4:
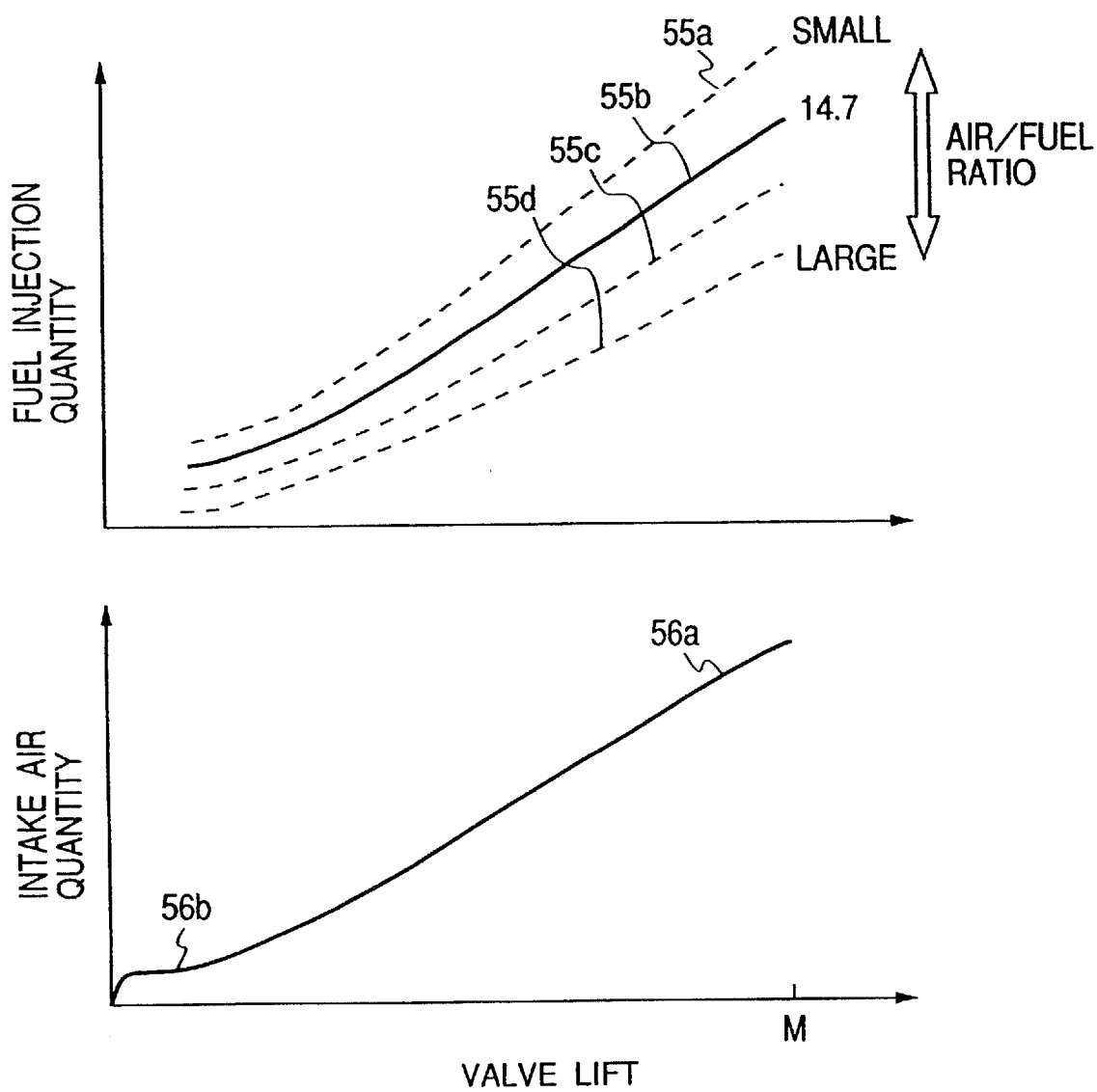
FIG. 4 is a graph showing the variations of fuel injection quantity and intake air quantity with valve lift in the first embodiment.

FIG. 4 is a graph showing the variations of fuel injection quantity and intake air quantity with valve lift in the first embodiment. In view of the controllability of the engine, it is desirable that the intake air quantity varies with valve lift linearly as indicated by a curve 56a. However, intake air quantity varies with valve lift in a mode indicated by a curved section 56b of the curve 56a when valve lift is small. If air/fuel ratio is fixed at a set air/fuel ratio, such as 14.7, fuel injection quantity is dependent on valve lift as indicated by a curve 55b. If the set air/fuel ratio is varied according to the operating condition of the engine, one of curves 55a to 55d is used selectively. A conventional method, which retrieves and determines a fuel injection quantity by an engine speed measured by the crank angle sensor and an air quantity measured by the air flow sensor from a fuel injection quantity map stored in the engine controller 13, may be used.

Figure 5:
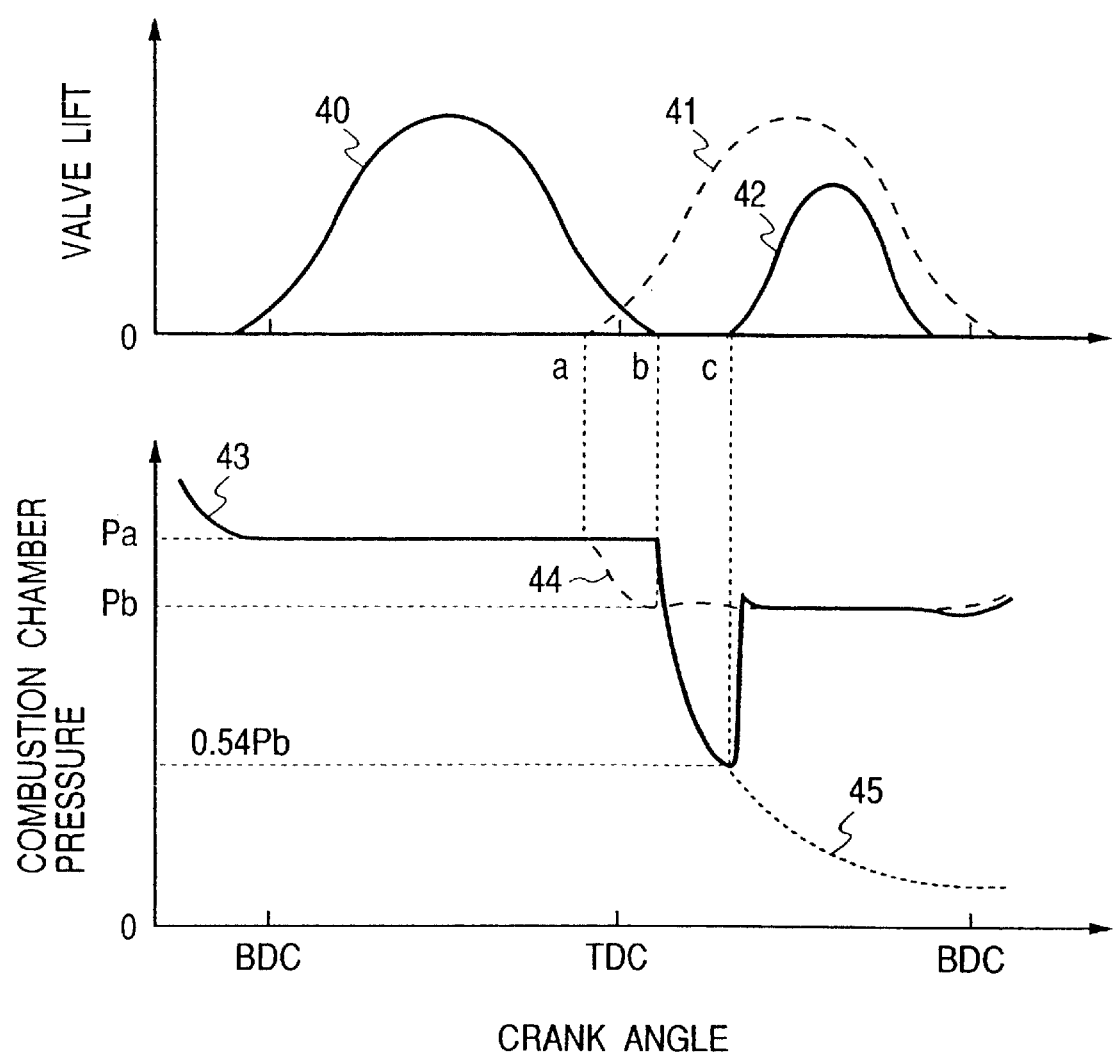
FIG. 5 is a graph showing the relation between valve lift and pressure in a combustion chamber in the first embodiment.

FIG. 5 is a graph showing the relation between the respective valve lifts of the intake valve 4 and the exhaust valve 5, and the pressure Pc in the combustion chamber in the first embodiment. In FIG. 5, a curve 40 indicates the variation of the valve lift of the exhaust valve. In this embodiment, control operation is executed so that the timing of opening the valve, the timing of closing the valve and the valve lift are fixed. A curve indicates the variation of the valve lift of the intake valve when the intake valve is operated according to conditions for high-load operation. In this operating state, the pressure Pc in the combustion chamber 17 is substantially equal to the atmospheric pressure Pa as indicated by a curve 43 while the exhaust valve 5 opens in a mode indicated by a curve 40 for exhaust stroke. If the intake valve 4 is opened at a crank angle a and the exhaust valve 5 is closed at a crank angle b so that an open state of the intake valve 4 and an open state of the exhaust valve 5 overlap each other in an angular period between the crank angles a and b, the pressure Pc in the combustion chamber 17 varies as indicated by a gray curve 44 and becomes substantially equal to the pressure Pb in the intake pipe 18 during suction stroke. In an engine provided with a throttle valve disposed above an intake system to control air flow, the pressure Pb is below the atmospheric pressure Pa. In the engine of the present invention not provided with any throttle valve, the pressure Pb is substantially equal to the atmospheric pressure. If the intake valve 4 is not opened after the exhaust valve 5 has been closed, the pressure Pc in the combustion chamber 17 will decrease as indicated by a broken curve 45 and when the piston reaches the bottom dead center BDC, $$Pc=Pa/\epsilon \quad (1)$$

where * is the compression ratio of the engine 1. If the intake valve 4 is opened at a crank angle c which makes the pressure Pc meet an inequality:

$$Pc<0.54*Pb \quad (2)$$

the pressure Pc in the combustion chamber 17 increases sharply, thereby generating an accompanying shock wave.

Figure 6:
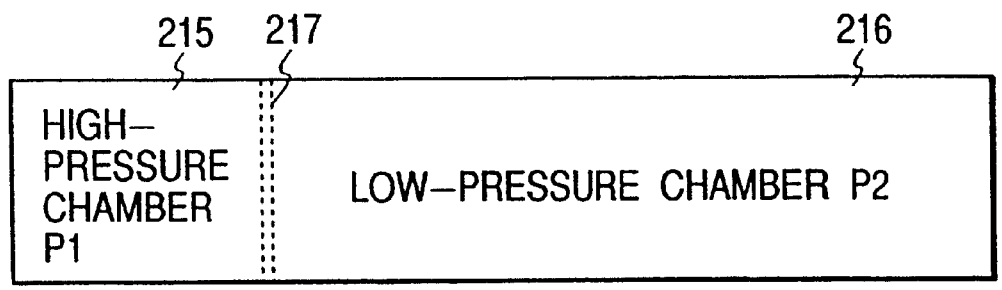
FIG. 6 is a view of assistance in explaining a principle of shock wave generation.

A principle of shock wave generation will be briefly described with reference to FIG. 6. Suppose that a high-pressure chamber 215 and a low-pressure chamber 216 partitioned by a partition film 217 contain a stationary gas, the pressure in the high-pressure chamber is PI and the pressure in the low-pressure chamber is P2. If the partition film 217 is broken when $$P2/P1<0.54 \quad (3)$$

the gas flows at a high velocity from the high-pressure chamber 215 into the low-pressure chamber 216. The velocity of the gas is not lower than a sound velocity; that is the gas flows at a velocity higher than Mach number one. Shock waves are classified into compression waves which increase the pressure, temperature and density of a gas as they propagate, and expansion waves which reduce the pressure, temperature and density of a gas as they propagate. A compression wave propagates from the high-pressure chamber 215 toward the low-pressure chamber 216. Pressure, temperature and density change discontinuously at the wavefront of a shock wave; the same increases at the wavefront of a compression wave.

If such a shock wave is generated in the combustion chamber of the engine, the shock wave is reflected repeatedly by the wall defining the combustion chamber. It is the point of the present invention to atomize the fuel by vibrating a spray of the fuel injected into the combustion chamber by the pressure energy of the shock wave.

The foregoing effect is available if the start of fuel injection is timed so as to be synchronized with the opening timing of the suction valve to inject the fuel into the combustion chamber immediately after the generation of a shock wave or while a shock wave is being generated as shown in FIG. 3. Thus, the fuel can be effectively atomized simply by controlling fuel injection start timing and intake valve opening timing, and any special modification of the fuel injector and the like for the atomization of the fuel is not necessary.

The generation of a shock wave must be predicted or detected and fuel injection must be controlled to realize the foregoing effect on an actual engine. One of methods of realizing the foregoing effect on an actual engine uses a crank angle sensor disposed on an engine. The crank angle sensor measures crank angles through the measurement of angular positions of a gear or a disk attached to the crankshaft or the like at angular intervals of several degrees, and gives signals representing the angular positions to an operating mode detecting unit for detecting an operating mode of the engine. The pressure Pc in the combustion chamber of the engine is substantially equal to the atmospheric pressure Pa at a moment immediately after the exhaust valve has been closed as shown in FIG. 5. If the intake valve is not opened while the piston is moving downward after the exhaust valve has been closed, the pressure Pc in the combustion chamber decreases as indicated by the curve 45 as mentioned above. The pressure Pc in the combustion chamber meet an expression:

$$Pc=0.54*Pa \quad (4)$$

if the volume V of the combustion chamber meet an expression:

$$V=Vt/0.54 \quad (5)$$

where Vt is the volume of the combustion chamber with the piston at the top dead center; that is, a shock wave is generated if the intake valve is opened when the volume ratio, i.e., the ratio of the volume of the combustion chamber to the volume of the same with the piston at the top dead center, is $1/0.54 \approx 2$ or above. Therefore, the engine controller is able to find the variation of the volume of the combustion chamber dependent on the bore of the combustion chamber and the stroke of the piston from the crank angle and is able to predict the generation of a shock wave on the basis of the variation of the volume of the combustion chamber.

Another method uses a intake pipe pressure sensor disposed in the intake passage of an engine to measure the pressure in a suction pipe. This method measures the pressure Pb in the intake pipe while the exhaust valve is closed, an operating mode detecting unit receives a pressure signal indicating the pressure Pb, and an arithmetic circuit included in an engine controller calculates a crank angle where the pressure Pc in the combustion chamber is expressed by:

$$Pc=0.54*Pb \quad (6)$$

and intake valve opening timing is determined so that the intake valve is opened at the calculated crank angle. Then, as mentioned above, the fuel is injected in synchronism with intake valve opening timing. This method also is able to predict the generation of a shock wave. This method which employs the intake pipe pressure sensor for measuring the pressure in the intake pipe for predicting the generation of a shock wave is effective when a throttle valve is disposed above the intake system, when the engine is provided with a supercharger or when the atmospheric pressure changes because the engine is operated at a place in highlands, i.e., when the pressure in the intake pipe is changed.

A third method of sensing the generation of a shock wave employs a combustion chamber pressure sensor disposed in the combustion chamber of an engine to measure the pressure in the combustion chamber. This method measures the pressure Pc in the combustion chamber at a moment the exhaust valve is closed, the measured pressure Pc is read by an operating mode detecting unit to hold the pressure in an engine controller, the variable pressure in the combustion chamber varying with the downward movement of the piston is measured continuously and the intake valve is opened when the value of the pressure Pc meets an expression:

$$Pc=0.54*Pc \qquad (7)$$

As mentioned above the fuel is injected in synchronism with intake valve opening timing. This method is able to predict the generation of a shock wave, and is able to ascertain the generation of a shock wave through the measurement of the variation of the pressure in the combustion chamber after the generation of the shock wave.

Figure 7:
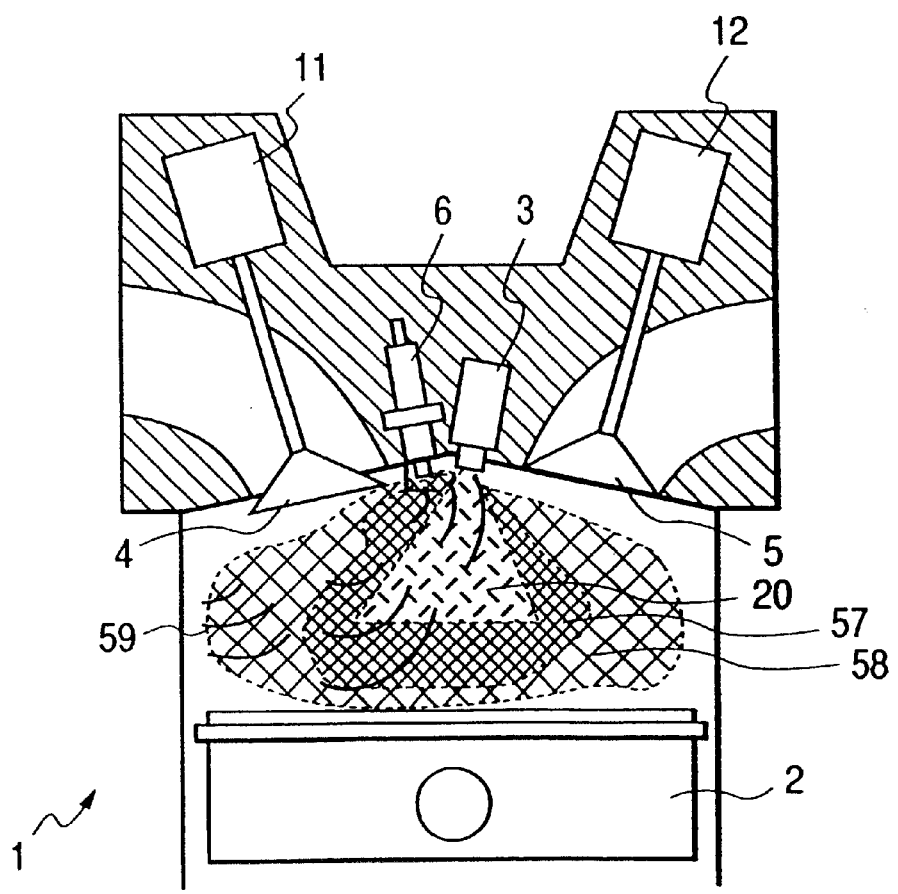
FIG. 7 is a typical sectional view of assistance in explaining fuel atomization by a shock wave in a combustion chamber.

FIG. 7 typically illustrates the condition of the interior of a combustion chamber when a shock wave is generated in the combustion chamber. A shock wave 59 is generated upon the opening of the intake valve 4 when one of the foregoing conditions for shock wave generation expressed by Expressions (1) to (5) is satified, the fuel 20 injected simultaneously with the opening of the intake valve 4 is vibrated and atomized by the pressure energy of the shock wave. Having a small mass, the atomized particles of the fuel are easily carried by air currents and disperse in sprays 57 and 58.

In this embodiment, intake valve opening timing is varied by the variable valve timing mechanism to generate a shock wave in the combustion chamber, and the fuel is injected in synchronism with the generation of the shock wave to atomize the fuel as shown in FIG. 7.

Figure 8:
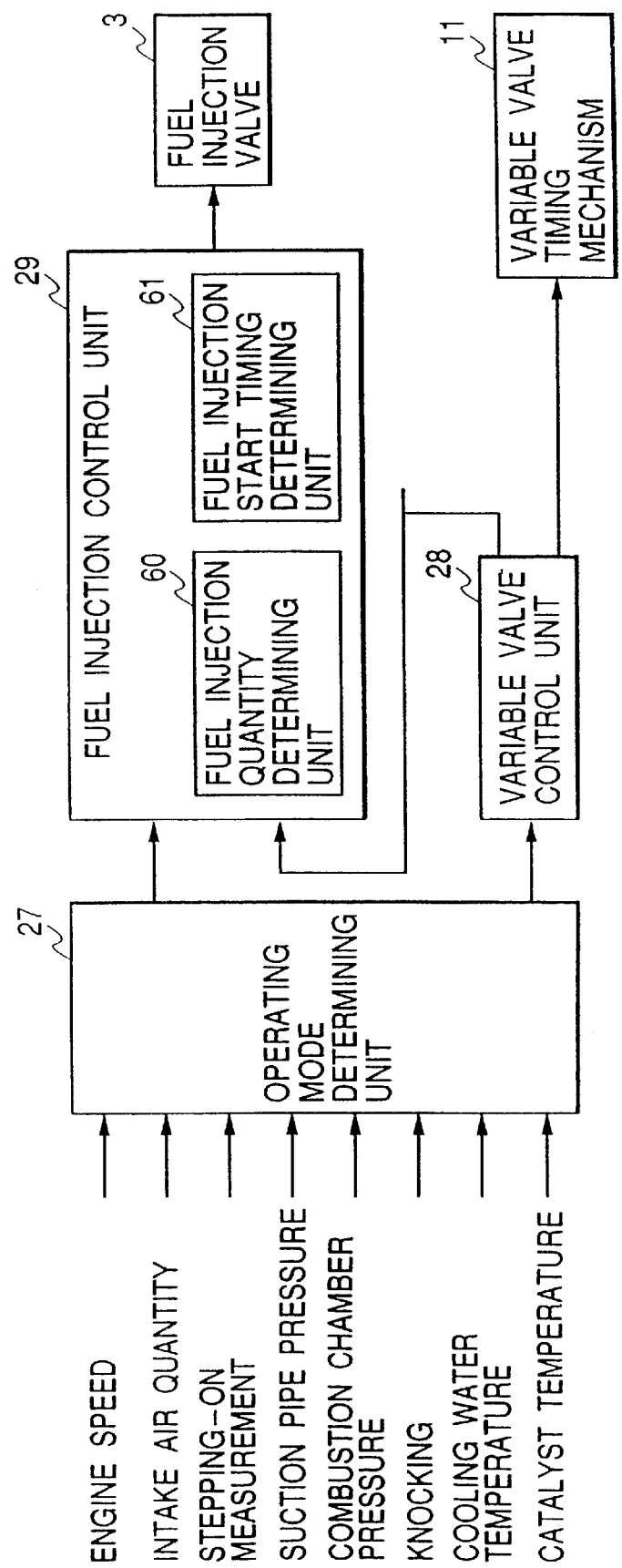
FIG. 8 is a block diagram showing the flow of control signals in the first embodiment.
Figure 9:
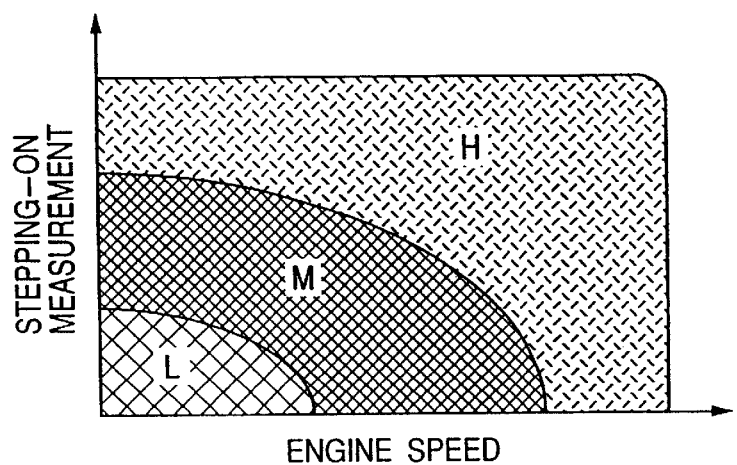
FIG. 9 is a diagrammatic view of a map for determining the operating mode of an engine in the first embodiment.

FIG. 8 is a block diagram showing the flow of control signals in the first embodiment. Flow of control signals in the engine controller and prediction of generation of a shock wave will be described with reference to FIG. 8. In a block 27, the engine controller 13 for controlling the engine 1 shown in FIG. 1 receives and holds data on engine speed, intake air quantity, stepping-on measurement of the accelerator pedal, pressure in the intake pipe, pressure in the combustion chamber, knocking, cooling water temperature and temperature of the catalytic unit, and determines the operating mode of the engine, i.e., a high-load operating mode, a medium-load operating mode or a low-load operating mode, from the data. For example, the operating mode detecting unit refers to a map of FIG. 9 defining operating condition of the engine by engine speed and the stepping-on measurement of the accelerator pedal, and decides that the engine is operating in the low-load, the medium-load or the high-load operating mode when the operating condition of the engine defined by engine speed and the stepping-on measurement of the accelerator pedal falls in a region L, a region M or a region H. In a block 28, the intake valve is controlled so as to generate a shock wave if it is decided in the block 27 that the engine is operating in a low-load or a medium-load operating mode. The generation of a shock wave is predicted or ascertained from signals provided by the crank angle sensor, the intake pipe pressure sensor and the combustion chamber pressure sensor, and fuel injection is started simultaneously with the generation of a shock wave. If it is decided that the engine is operating in a high-load operating mode, the engine output demanded by the driver is estimated from the stepping-on measurement of the accelerator, and the lift of the intake valve is increased and the open period of the intake valve is extended to increase intake air quantity so that the engine will provide the demanded engine output. Although any shock wave is not generated in such an operating mode, a spray of the fuel and air are mixed satisfactorily, stable combustion can be achieved and any problem does not arise because the flow of air in the combustion chamber is intensified by the increased intake air quantity and an increased engine speed.

In a block 60 included in a block 29, an intake air quantity is estimated from the lift of the intake valve determined in the block 28 and determines a fuel injection quantity so that a mixture of the set air/fuel ratio can be produced. The fuel injection quantity may be determined from the map defining fuel injection quantities as a function of engine speed and intake air quantity stored in the block 27. If the block 27 decides that the engine is operating in a low-load or the medium-load operating mode, and a shock wave is to be generated, a block 61 determines fuel injection starting time so that fuel injection starting timing is synchronized with intake valve opening timing. If it is decided that the engine is operating in a high-load operating mode and any shock wave need not be generated, intake valve opening timing is advanced to increase an overlapping period in which both the intake valve and the exhaust valve are open to increase the charging efficiency by the agency of the pulsation of the negative pressure in the exhaust pipe. Control signals for controlling intake valve opening timing, intake valve closing timing, the valve lift, the fuel injection quantity and fuel injection start timing determined in the blocks 28 and 29 are given to the variable valve timing mechanism in a block 11, and to the fuel injector in a block 3 and operations are timed by those timing signals.

Figure 10:
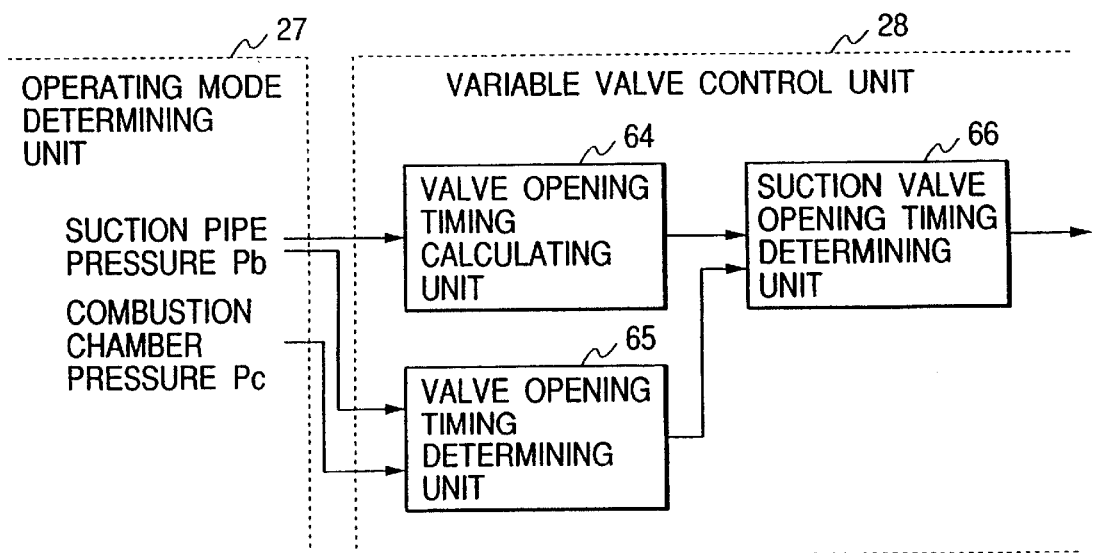
FIG. 10 is a block diagram showing the flow of control signals in the first embodiment.

Another method of accurately determining intake valve opening timing to generate a shock wave, which is a point of the present invention, will be described with reference to FIG. 10. FIG. 10 is a block diagram showing the flow of control signals between the blocks 27 and 28. A block 64 calculates a crank angle at which the combustion chamber pressure Pc shown in FIG. 5 meets Expression (6) by using the signal indicating the intake pipe pressure Pb and received by the block 27, and a block 66 determines intake valve opening timing on the basis of the crank angle calculated by the block 64. A third method determines which one of Expressions (4), (6) and (7) is met by the combustion chamber pressure Pc by a block 65 when a signal indicating the combustion chamber pressure Pc is given to the block 27, and a block 66 decides a crank angle at that time as intake valve opening timing. Thus, intake valve opening timing can be accurately determined.

Figure 11:
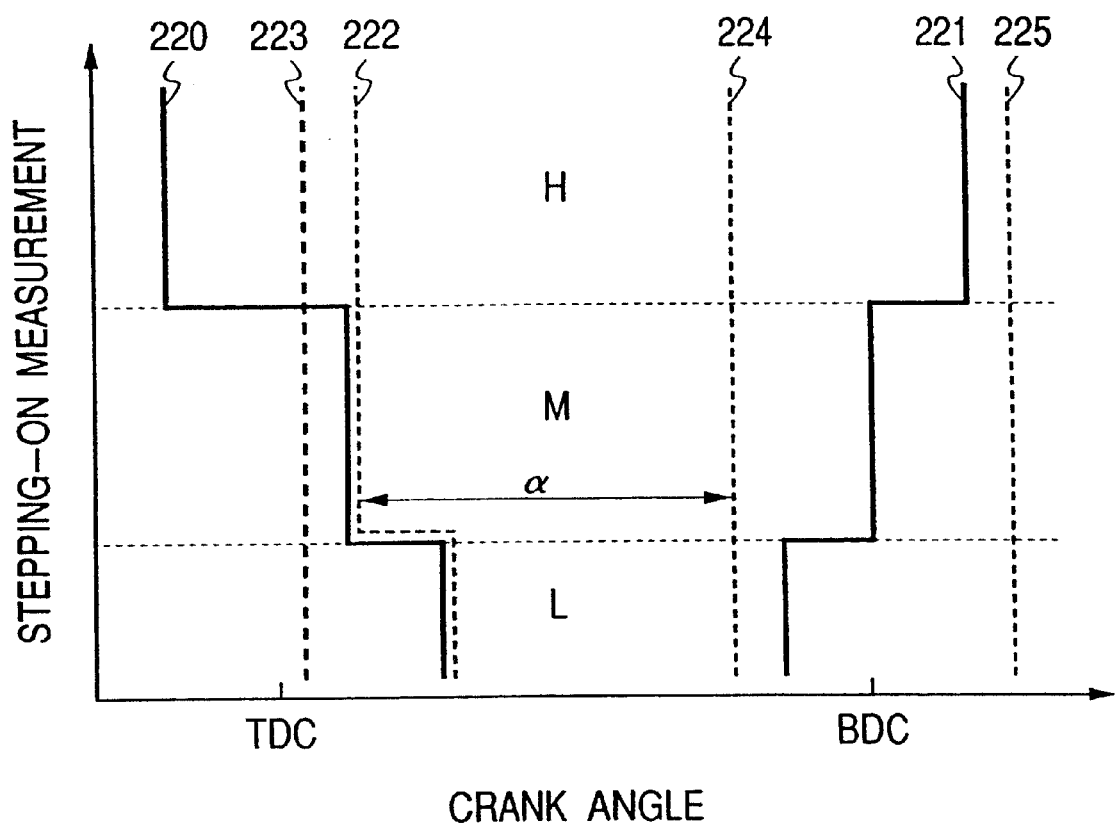
FIG. 11 is a diagram of assistance in explaining the relation between the state of the intake valve and fuel injection timing.

Another method of determining fuel injection starting time by the block 61 of FIG. 8 will be described with reference to FIG. 11 showing the relation between stepping-on measurement of the accelerator pedal, and open state and fuel injection timing. For example, intake valve opening timing and intake valve closing timing vary along curves 220 and 221 according to the operating mode of the engine determined by the block 27 of FIG. 8. Valve lift varies along a curve 78 shown in FIG. 12. If it is decided that the engine is operating in a low-load operating mode, an angular interval between intake valve opening timing and intake valve closing timing is small, the intake valve is open for a short time and valve lift is small. If it is decided that the engine is operating in a medium-load operating mode, intake valve opening timing is advanced and intake valve closing timing is delayed to increase the intake valve opening period, and valve lift is increased. In this case, the fuel injection start timing is set close to the intake valve opening timing as indicated by a curve 222 to generate a shock wave. If it is decided that the engine is operating in a high-load operating mode, the overlap of the intake valve and the exhaust valve is further increased by further advancing the intake valve opening timing and further delaying the intake valve closing timing so that charging efficiency is increased by the pulsation of a negative wave in the exhaust pipe and the pulsation of a positive wave in the intake pipe to further increase the intake air quantity. If fuel injection start timing 222 is advanced ahead of exhaust valve closing timing 223, it is possible that unburned fuel is discharged and the quality of the exhaust gas is deteriorated. Therefore, fuel injection start timing 222 cannot be advanced ahead of exhaust valve closing timing 223 and hence any shock wave cannot be generated in this case. However, a spray of the fuel and air are mixed satisfactorily, combustion is not deteriorated and any problem does not arise because the flow of air in the combustion chamber is intensified by the increased intake air quantity and an increased engine speed.

If a lean burn operation using a mixture of a large air/fuel ratio is desired, an angular delay * of fuel injection timing 224 behind intake valve opening timing may be increased so that fuel injection start timing 224 is close to intake valve closing timing or fuel injection start timing may be delayed as indicated at 225 behind intake valve closing timing. If fuel injection is started at such delayed fuel injection start timing, the fuel is not dispersed in a wide region and concentrated on regions around the ignition plug to produce the so-called stratified mixture suitable for lean burning.

Figure 12:
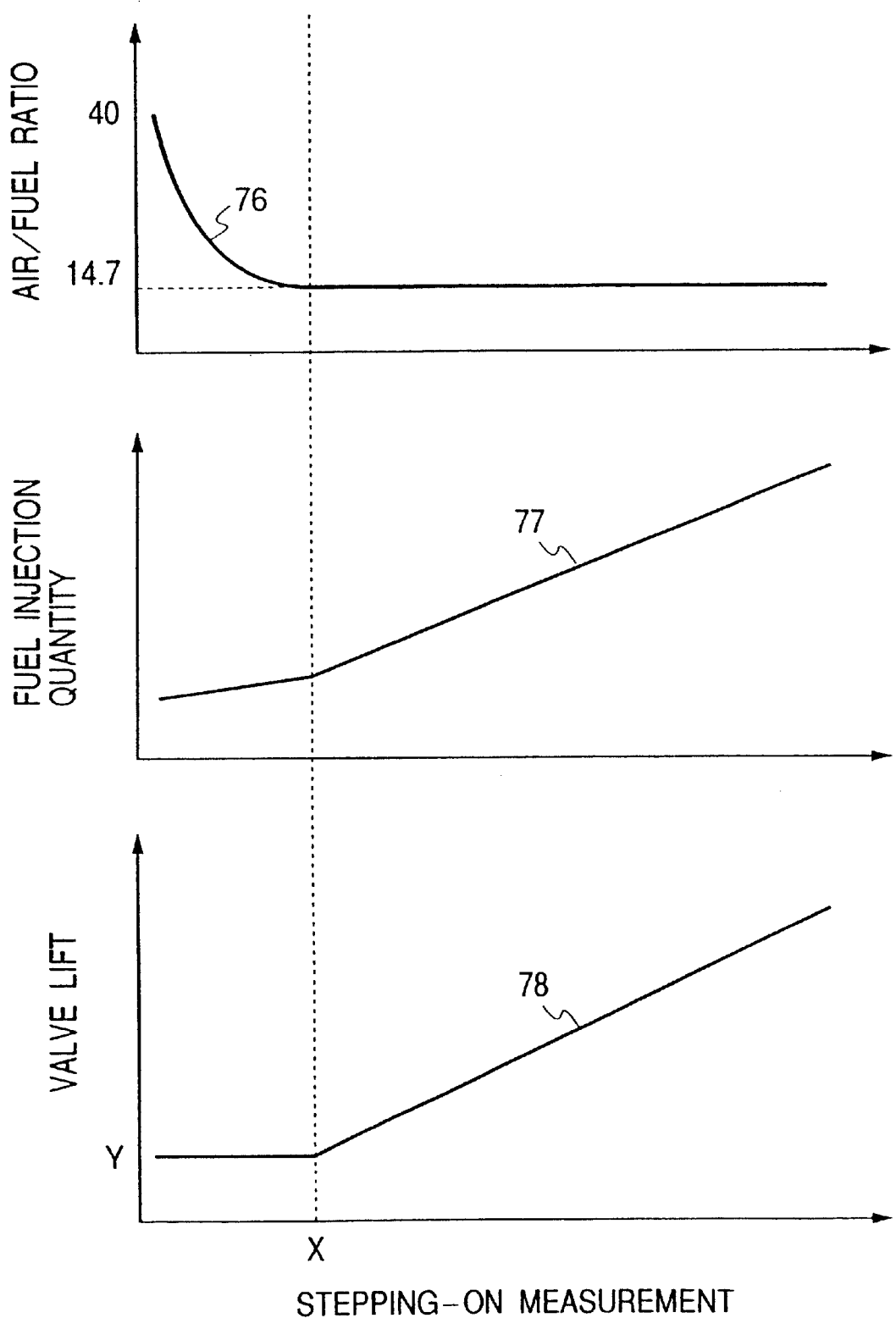
FIG. 12 is a graph showing the variations of the lift of a valve, fuel injection quantity and air/fuel ratio with the stepping-on measurement of an accelerator pedal.
Figure 13:
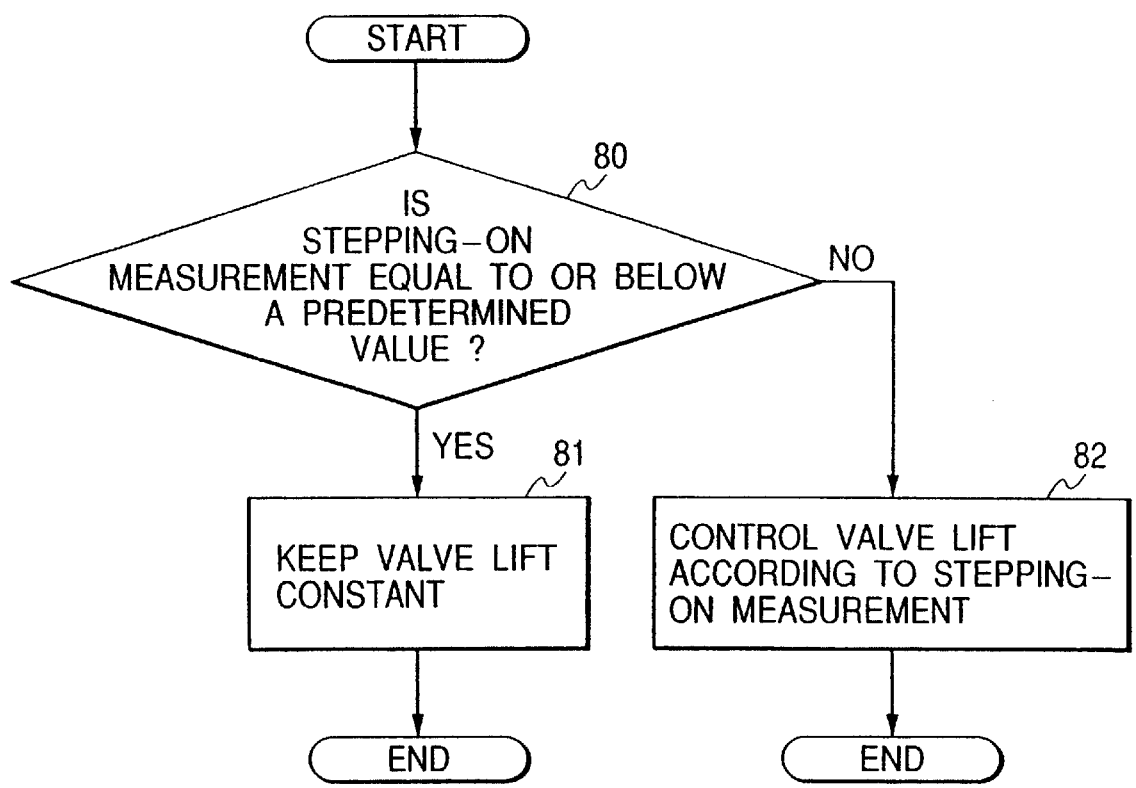
FIG. 13 is a block diagram showing the flow of a control signal in a second embodiment.

FIGS. 12 and 13 show a second embodiment of the present invention. FIG. 12 is a graph showing the variations of valve lift, fuel injection quantity and air/fuel ratio with the stepping-on measurement of an accelerator pedal. A stepping-on measurement of the accelerator pedal represents an engine output demanded by the driver. It is considered that a high engine output is demanded when stepping-on measurement of the accelerator pedal is large, and it is considered that not a very high engine output is demanded when stepping-on measurement of the accelerator pedal is small. An engine like that of the present invention not provided with any throttle valve in the intake system needs to control intake air quantity to be sucked into the combustion chamber of the engine by the intake valve. Since the quantity of air flowing through the intake valve is roughly proportional to the area of an opening formed by lifting the intake valve, air quantity can be estimated from the lift of the intake valve. This method is able to estimate air quantity without delay and, if the engine is of a direct fuel injection type, the fuel may be injected into the combustion chamber after estimating air quantity by this method. Accordingly, the fuel injection quantity can be controlled according to air quantity which varies every cycle to avoid deteriorating the quality of the exhaust gas, to stabilize combustion and to reduce vibrations of the engine. A method of correcting the estimated air quantity by using a measured air quantity measured by an air flow sensor may be employed additionally.

In this embodiment, valve lift is controlled according to the variation of the stepping-on measurement of the accelerator pedal as indicated by a curve 78 in FIG. 12, and a fuel injection quantity is determined as indicated by a curve 77 on the basis of an estimated air quantity estimated on the basis of valve lift or a corrected air quantity determined by correction using a measured air quantity measured by the air flow sensor. When determining fuel injection quantity, a set air/fuel ratio for the stepping-on measurement of the accelerator pedal is taken into consideration. The engine controller decides that engine output demanded by the driver is low if the stepping-on measurement of the accelerator pedal is small, and reduces the valve lift of the intake valve to reduce intake air quantity. The estimation of intake air quantity is difficult, the accurate estimation of intake air quantity is impossible, the flow of air in the combustion chamber becomes sluggish and unstable combustion occurs if the valve lift is excessively small. Therefore, as shown in FIG. 13 in a block diagram, the valve lift is fixed when the stepping-on measurement of the accelerator pedal is not greater than a value X to keep intake air quantity constant, fuel injection quantity is reduced and air/fuel ratio is increased to control engine output. Thus, the deterioration of combustion is avoided. Fuel consumption is improved by the reduction of fuel injection quantity. With a direct fuel injection engine, in particular, response characteristic is excellent because the fuel is injected directly into the combustion chamber.

Figure 14:
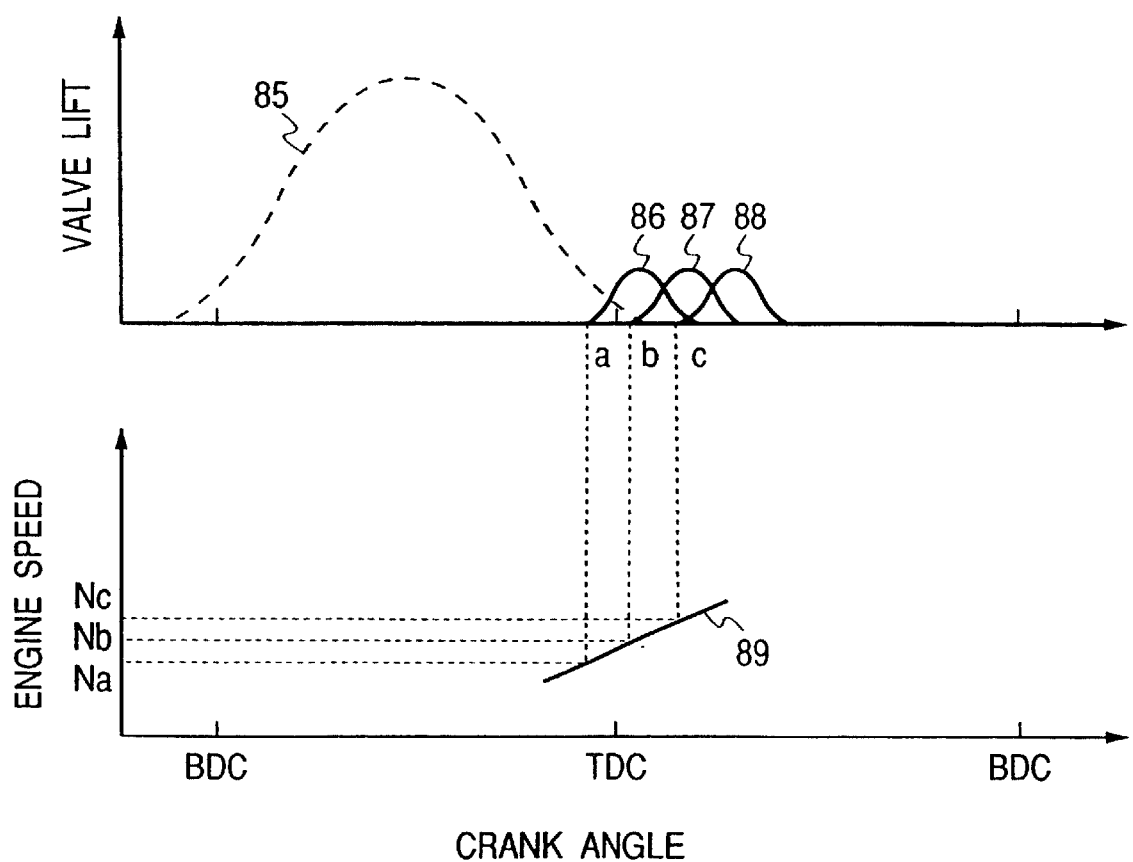
FIG. 14 is a graph of assistance in explaining a third embodiment of the present invention.

FIG. 14 is a graph of assistance in explaining a third embodiment of the present invention. Usually, engine output is increased by increasing intake air quantity to provide driving power for driving an engine accessory, such as an air conditioning system while an engine is operating under a very light load, i.e., while the engine is idling. In a conventional engine provided with a throttle valve, intake air quantity is regulated by opening and closing a bypass passage bypassing the throttle valve by a valve disposed in the bypass passage for the fine adjustment of air quantity without opening the throttle valve, which, however, increases the number of parts and increases the costs. In the engine 1 illustrated in FIG. 1, the variable valve timing mechanism of the present invention keeps the open period and the valve lift of the intake valve constant and regulates intake valve opening timing and suction valve closing timing minutely to regulate the engine speed and the driving force of the engine. When the engine is in a suction stroke, the piston moves from the top dead center TDC toward the bottom dead center BDC and air is sucked accordingly into the combustion chamber. When the crankshaft is at crank angles a and b, the piston is near the top dead center and moves at a low speed, and hence intake air quantity is small. When the crankshaft is at a crank angle c, the piston is at a position past the top dead center and the speed of the piston is increasing, and hence intake air quantity increases even if the valve lift and the open period of the intake valve are kept constant. Therefore, if it is desired to provide driving force for driving, for example, an accessory, engine speed is increased by adjusting the intake valve opening timing so that the intake valve is opened at the crank angle c to increase engine output. If the intake valve opening timing corresponds to the crank angle a or b, engine speed is suppressed to prevent the increase of fuel consumption. Thus, the variable valve timing mechanism of the present invention is able to exercise the foregoing effects without requiring any additional parts.

Figure 15:
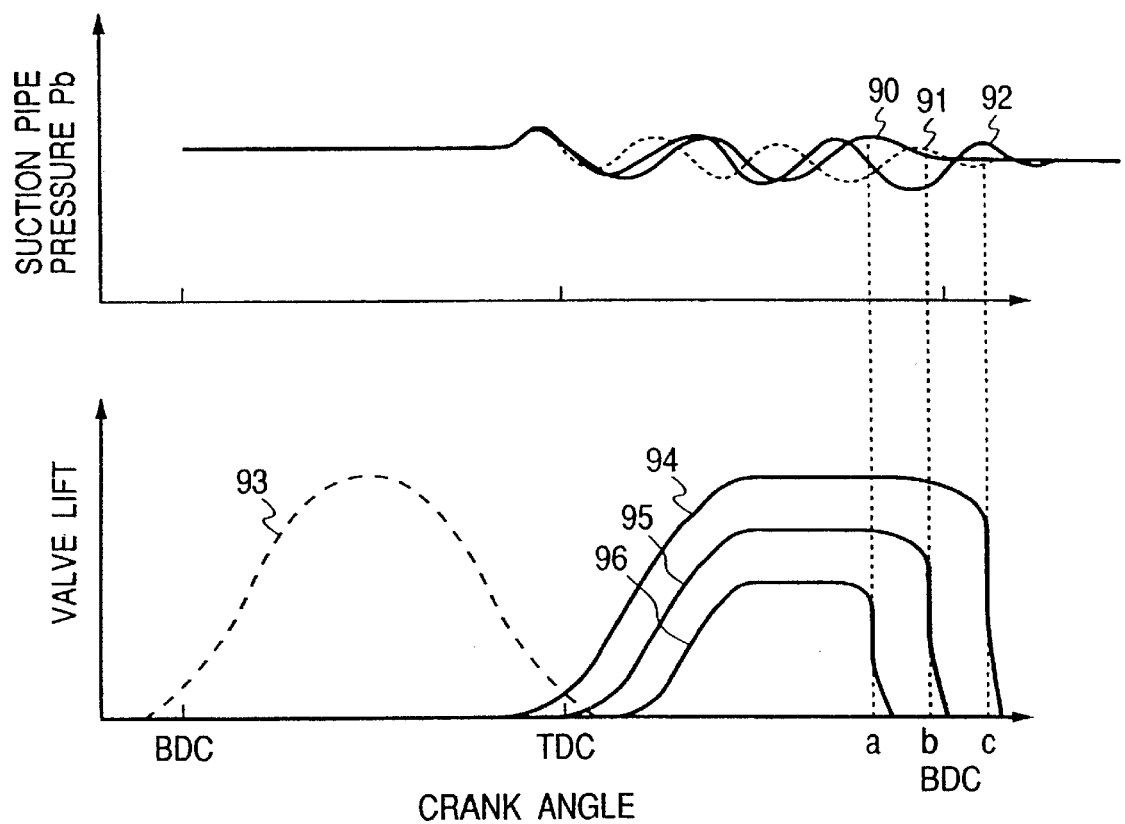
FIG. 15 is a graph of assistance in explaining a fourth embodiment of the present invention.

FIG. 15 is a graph of assistance in explaining a fourth embodiment of the present invention. FIG. 15 shows the relation between crank angle and intake pipe pressure Pb. Pressure in the intake pipe of an engine pulsates when a intake valve is opened, and a positive pressure wave of a pressure above the mean intake pipe pressure and a negative pressure wave of a pressure below the mean intake pipe pressure propagate alternately. Therefore, an increased quantity of air greater than a normal quantity of air is sucked into the combustion chamber, effectively increasing engine output if a positive pressure wave portion of pressure pulsation enters the combustion chamber. If a negative pressure wave portion of pressure pulsation enters the combustion chamber, a reduced quantity of air smaller than the normal quantity of air is sucked into the combustion chamber and thereby engine output decreases. Therefore, a mechanism for changing the length of the intake pipe has been employed to make a positive pressure wave enter the combustion chamber regardless of engine speed. Most methods employing such a mechanism change the length of the intake pipe gradually, and thus the foregoing inertia supercharging effect is available only in a range of engine speed matching with the length of the intake pipe. A structure for changing the length of the intake pipe is necessary, which increases the number of parts and the cost. According to the present invention, in the engine 1 shown in FIG. 1, the engine controller 13 determines the intake pipe pressure on the basis of the output signal of the intake pipe pressure sensor 23, and closes the intake valve instantaneously upon the entrance of a positive pressure wave of intake pipe pressure pulsation indicated by a curve 90, 91 or 92 as shown in FIG. 15. The curves 90, 91 and 92 indicate, for example, pulsations of intake pipe pressure Pb when engine speed is 1000, 2000 and 3000 rpm, respectively, and have different phases. Engine output can be enhanced by raising combustion chamber pressure, i.e., by increasing air quantity, by instantaneously closing the intake valve as indicated by a curve 94, 95 or 96. Thus, the foregoing inertia supercharging effect is available in a wide range of engine speed. Thus, the variable valve timing mechanism of the present invention is able to exercise the foregoing effects without requiring any additional parts.

Figure 16:
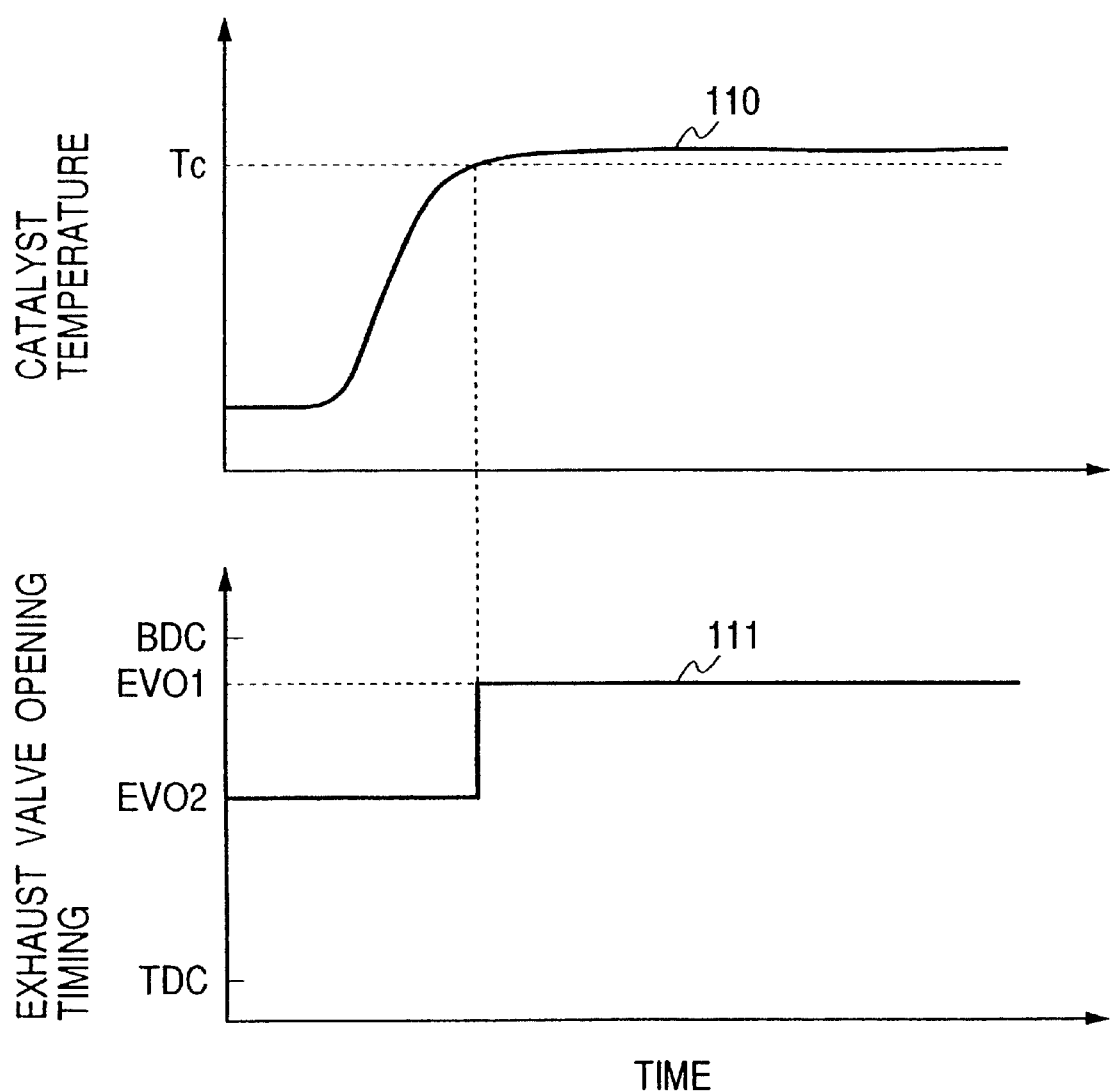
FIG. 16 is a graph of assistance in explaining a fifth embodiment of the present invention.

FIG. 16 is a graph of assistance in explaining a fifth embodiment of the present invention. FIG. 16 shows a mode of increase of catalyst temperature with the variation of exhaust valve opening timing. Catalyst temperature is low in a state immediately after the start of the engine and hence the exhaust gas cannot be purified at a high purification ratio. However, the engine discharges the unburned fuel due to imperfect combustion during operation immediately after the start of the engine. Since the purification power of the catalyst is low until its temperature rises beyond an activation temperature, the unburned fuel discharge from the engine during operation immediately after the start of the engine is discharged outside through the exhaust pipe, causing environmental pollution by the exhaust gas. A conventional method uses an electric heater to heat the catalyst quickly to a temperature above the activating temperature. However, the electric heater employed in this method needs much power, increases load on the vehicle for power generation and, consequently, air quantity is increased and engine speed is raised to increase power generated by the engine. Consequently, power consumption increases inevitably and cost increases. According to the present invention, in the engine 1 shown in FIG. 1, the engine controller determines catalyst temperature on the basis of the output signal of the catalyst temperature sensor during operation immediately after the start of the engine, and advances normal exhaust valve opening timing EVO1 to advanced exhaust valve opening timing EVO2 as indicated by a curve 111 if the measured catalyst temperature is lower than the activating temperature Tc to discharge the high-temperature exhaust gas from the combustion chamber during the expansion stroke to heat the catalyst as indicated by a curve 110. The advanced exhaust valve opening timing EVO2 is delayed to the normal exhaust valve opening timing EVO1 after the catalyst has been heated to a temperature not lower than the activating temperature. The variable valve timing mechanism of the present invention which carries out this method is able to exercise the foregoing effects without requiring any special device.

Figure 17:
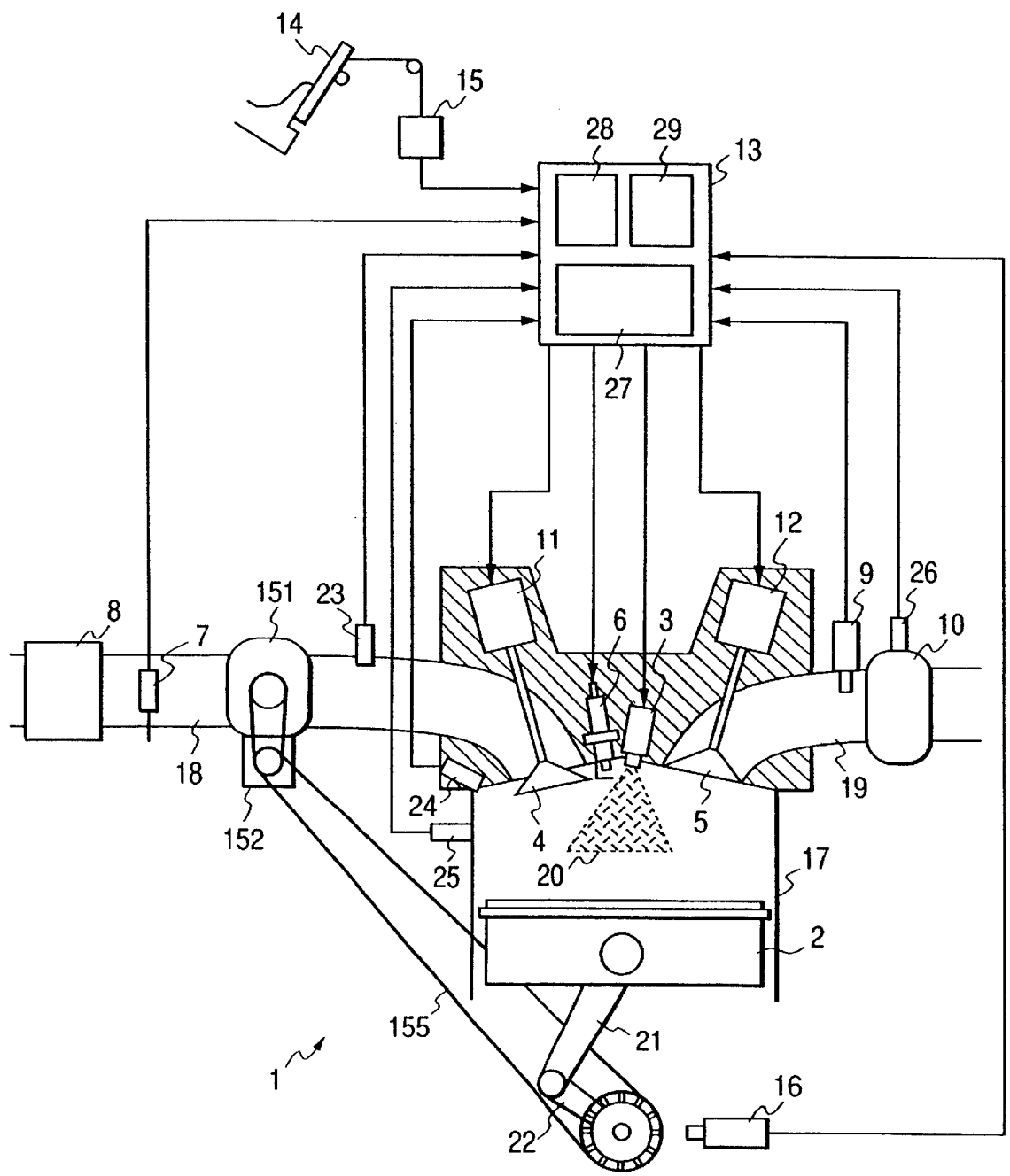
FIG. 17 is a typical view of a sixth embodiment of the present invention.
Figure 18:
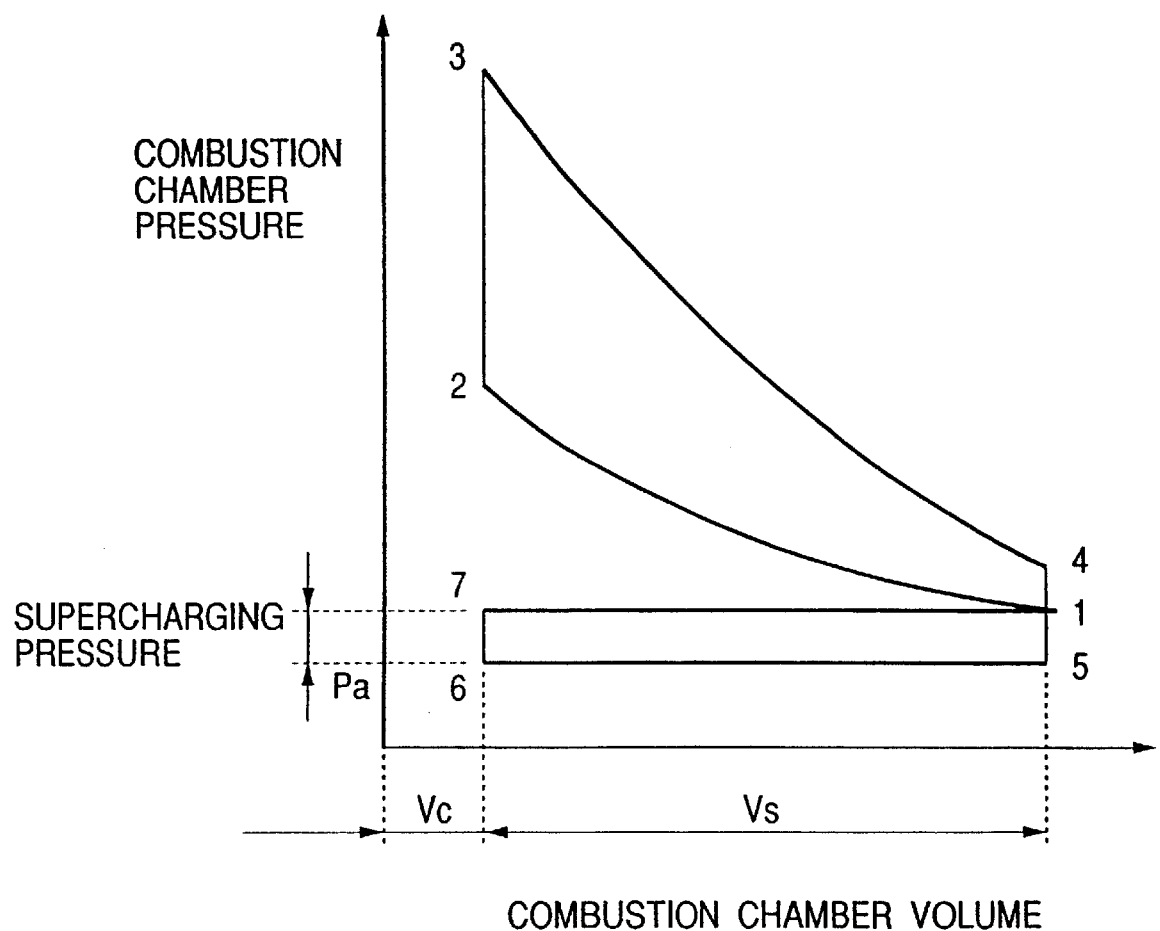
FIG. 18 is a graph showing the relation between the volume of a combustion chamber and pressure in the combustion chamber when compression ratio is equal to expansion ratio.

FIG. 17 shows a sixth embodiment of the present invention. A mechanical supercharger 151 for enhancing the pressure of intake air is disposed in a suction duct 18 of an engine 1 to supply air of a pressure above the atmospheric pressure to the engine 1. In the engine provided with the supercharger 151, knocking occurs due to an excessively high boost pressure. The supercharger may be a turbo charger, a supercharger or a motor-driven charger. FIG. 18 shows the theoretical relation between the volume of a combustion chamber and pressure in the combustion chamber on an assumption that combustion and gas exchange occur in a moment. Referring to FIG. 18, the engine 1 sucks air pressurized by the supercharger in the suction stroke from a point 7 to a point 1 and compresses a mixture of air and the fuel in a combustion chamber 17 in a time from the point 1 to a point 2, the mixture is ignited and burns instantaneously and the pressure in the combustion chamber increases at the point 2 to a pressure at a point 3. The high-pressure combustion gas depresses a piston in the expansion stroke from the point 3 to a point 4 to deliver engine output. An exhaust valve is opened at the point 4, exhaust pressure drops instantaneously in a time from the point 4 to a point 5, and the gas is discharged from the combustion chamber in a time from the point 5 to a point 6. Occurrence of knocking will be explained with reference to FIG. 18. Knocking, i.e., the generation of unpleasant sound and vibrations, occurs when boost pressure is excessively high, the temperature of the compressed mixture, i.e., temperature at the point 2, is excessively high, and detonation other than normal flame propagation starts in a portion of the unburned mixture. A conventional knocking evasion method sets the engine at a low compression ratio. However, in the conventional engine in which valve opening timing and valve closing timing are fixed, expansion ratio is decreased if the compression ratio is decreased, and the efficiency of the conversion of thermal energy generated in the combustion chamber into engine output is reduced. In FIG. 18, a compression ratio * and an expansion ratio *' are expressed by:

$$\epsilon = \epsilon' = 1 + Vs/Vc \qquad (8)$$

where Vc is the volume of the combustion chamber and Vs is the stroke volume of the engine 1.

Figure 19:
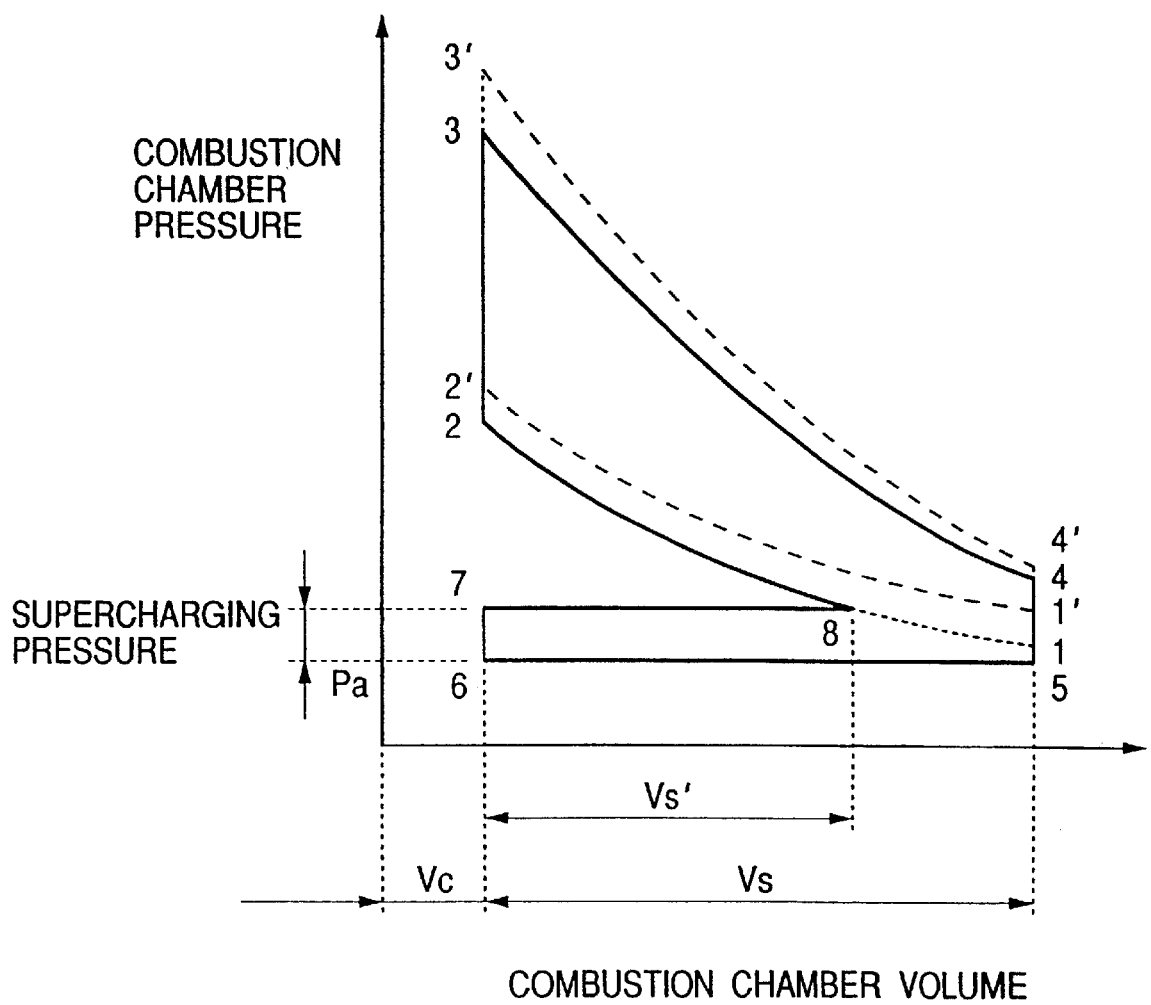
FIG. 19 is a graph showing the relation between the volume of a combustion chamber and pressure in the combustion chamber when compression ratio is not equal to expansion ratio.

FIG. 19 shows the theoretical relation between the volume of a combustion chamber and pressure in the combustion chamber on an assumption that combustion and gas exchange occur in a moment. When the intake valve is closed by the variable valve timing mechanism of the present invention at a point 8 during the suction stroke in which the piston is moving down, combustion chamber pressure Pc expands from the point 8 to a point 1, changes from the point 1 to the point 8 as the piston moves up after passing the bottom dead center, and returns to the point 8. Subsequently, substantial compression is started. Therefore, compression ratio is expressed by:

$$\epsilon = 1 + Vs'/Vc \qquad (9)$$

The mixture is ignited at a point 2 and burns. Expansion ratio in the expansion stroke from a point 4 to a point 5 is:

$$\epsilon' = 1 + Vs/Vc$$

Since Vs'<Vs, (compression ratio)<(expansion ratio). In FIG. 19, a substantial suction stroke is carried out from a point 7 to a point 8 and intake air quantity is small. Since the substantial compression ratio is low, the temperature of the compressed mixture, i.e., a temperature at the point 2, is lower than the temperature of the compressed mixture when the compression ratio is high, i.e., a temperature at a point 2' and, consequently, knocking can be evaded.

Figure 20:
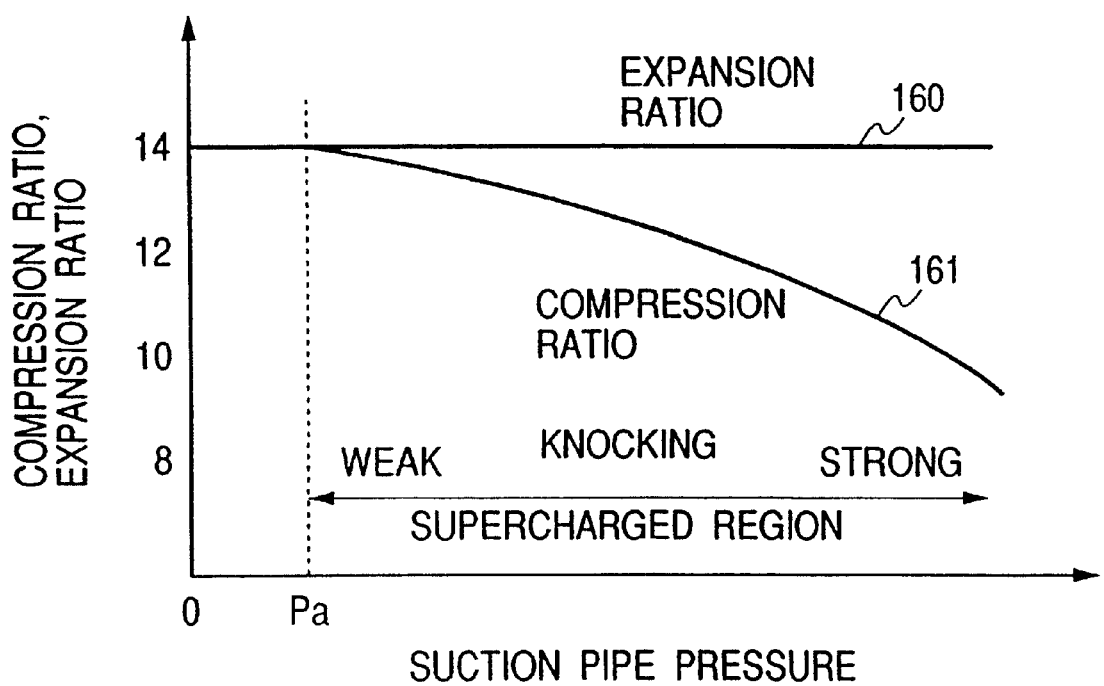
FIG. 20 is a graph showing the dependence of compression ratio and expansion ratio on pressure in a suction pipe.

Although the compression ratio is low, the expansion ratio is high and hence thermal energy generated in the combustion chamber can be effectively converted into engine output. Accordingly, the substantial compression ratio can be changed by controlling the intake valve closing timing at the point 8 to evade knocking. FIG. 20 shows the dependence of compression ratio and expansion ratio on boost pressure. When boost pressure is increased, the engine controller determines whether or not knocking has occurred on the basis of the output signal of the knocking sensor and, if knocking has occurred, advances intake valve closing timing to reduce the substantial compression ratio. However, the expansion ratio is kept constant to convert the thermal energy generated in the combustion chamber effectively into engine output.

In a supercharged engine in which the fuel is injected through a suction port, the ratio of specific heat of a mixture supercharged into the combustion chamber is affected greatly by the ratio of specific heat of the fuel and is in the range of 1.2 to 1.3. When supercharging a direct fuel injection engine, in which the fuel is injected directly into the combustion chamber, according to the present invention, the supercharger pressurizes only air, the pressurized air is supercharged into the combustion chamber, and then a quantity of the fuel determined on the basis of the quantity of air is injected. Therefore, the ratio of specific heat of a mixture thus produced is nearly equal to 1.4 times the ratio of specific heat of air and hence the quantity of air greater than that of air which can be charged into the intake port fuel injection engine can be charged into the intake fuel injection engine to enhance engine output.

Knocking can be easily evaded and, at the same time, engine output can be enhanced by the foregoing structure.

What is claimed is:

1. An internal combustion engine control system for controlling an internal combustion engine, comprising:

means for controlling fuel injection quantity to be injected by a fuel supply system for supplying fuel to the internal combustion engine, and to control fuel injection timing so as to obtain stable combustion; and means for continuously or gradually varying at least opening timing, closing timing or lift of one of an intake valve and an exhaust valve for sealing up a combustion chamber of the internal combustion engine and reducing pumping loss of the internal combustion engine at low load operation while enhancing engine power output at high load operation, wherein the fuel injection control means controls at least one of fuel injection quantity and fuel injection timing on the basis of a value of a controlled variable provided by the variable valve control means.

2. The internal combustion engine control system according to claim 1, further comprising a supercharger disposed in an intake passage of the internal combustion engine.

3. The internal combustion engine control system according to claim 1, further comprising:

means for one of sensing and estimating crank angles of the internal combustion engine, and means for one of sensing and estimating pressure in an intake pipe of the internal combustion engine, wherein the continuously or gradually varying means controls intake valve opening timing on the basis of the results of sensing actions of the crank angle sensing means and the intake pipe pressure sensing means.

4. The internal combustion engine control system according to claim 2, further comprising:

means for one of sensing and estimating crank angles of the internal combustion engine, and means for one of sensing and estimating pressure in an intake pipe of the internal combustion engine;

wherein the continuously or gradually varying means controls intake valve opening timing on the basis of the results of sensing actions of the crank angle sensing means and the intake pipe pressure sensing means.

5. The internal combustion engine control system according to claim 1, wherein means is provided for one of sensing and estimating stepping on measurement of an accelerator pedal, and the continuously or gradually varying means is configured to set the lift of the intake valve of the internal combustion engine at a fixed value and to set intake valve opening period at a predetermined period with an accelerator pedal stepping-on measurement being not greater than a predetermined value, and to control air quantity to be sucked by the internal combustion engine by varying intake valve opening timing.

6. The internal combustion engine control system according to claim 1, further comprising means for one of sensing and estimating temperature of a catalyst disposed in an exhaust passage of the internal combustion engine, wherein, when the temperature of the catalyst is not higher than a predetermined value, the continuously or gradually varying means is configured to open the exhaust valve of the internal combustion engine at a time earlier than a time when the exhaust valve is opened and the temperature of the catalyst is higher than the predetermined value.

7. An internal combustion engine control system for controlling an internal combustion engine, comprising:

means for controlling fuel injection quantity to be injected by a fuel injection system for directly injecting fuel into a combustion chamber of the internal combustion engine, and to control fuel injection timing for obtaining stable combustion; and means for one of continuously and gradually varying at least one of opening timing, closing timing and lift of one of an intake valve and an exhaust valve for sealing up the combustion chamber of the internal combustion engine and reducing engine pumping loss at low load operation and improving engine power output at high load operation, wherein the fuel injection control means is configured to control at least one of fuel injection quantity and fuel injection timing on the basis of a value of a controlled variable provided by the continuously or gradually varying means.

8. The internal combustion engine control system according to claim 7, further comprising a supercharger disposed in an intake passage of the internal combustion engine.

9. The internal combustion engine control system according to claim 7, further comprising a knocking determination means for one of sensing and estimating knocking in the internal combustion engine, wherein the continuously or gradually varying means controls at least one of valve opening timing, valve closing timing and valve lift of the intake valve continuously or gradually on the basis of the result of sensing action of the knocking determination means to control compression ratio of the internal combustion engine.

10. The internal combustion engine control system according to claim 7, further comprising:
means for one of sensing and estimating crank angles of the internal combustion engine, and
means for one of sensing and estimating pressure in an intake pipe of the internal combustion engine,
wherein the continuously or gradually varying means controls intake valve opening timing on the basis of sensed or estimates of crank angles and intake pipe pressure.

11. The internal combustion engine control system according to claim 7, further comprising a catalyst temperature determining means for sensing or estimating temperature of a catalyst disposed in an exhaust passage of the internal combustion engine,
wherein, when the temperature of the catalyst is not higher than a predetermined value, the continuously or gradually varying means is configured to open the exhaust valve of the internal combustion engine at a time earlier than a time when the exhaust valve is opened and the temperature of the catalyst is higher than the predetermined value.

12. An internal combustion engine control system for controlling an internal combustion engine, comprising:
apparatus configured to control a fuel injection quantity to be injected by a fuel supply system for supplying fuel to the internal combustion engine, and to control fuel injection timing whereby a stable combustion is obtained; and
apparatus configured to vary continuously or gradually at least opening timing, closing timing or lift of one of an intake valve and an exhaust valve to seal up a combustion chamber of the internal combustion engine and reduce engine pumping loss at low load operation and increasing engine power output at high load operation,
wherein the fuel injection control apparatus is operative to control at least one of fuel injection quantity and fuel injection timing on the basis of a value of a controlled variable provided by the variable valve control apparatus.

13. The internal combustion engine control system according to claim 12, further comprising a supercharger disposed in an intake passage of the internal combustion engine.

14. The internal combustion engine control system according to claim 12, further comprising:
apparatus configured to one of sense and estimate crank angles of the internal combustion engine, and
apparatus configured to one of sense and estimate pressure in an intake pipe of the internal combustion engine,
wherein the continuously or gradually varying apparatus controls intake valve opening timing on the basis of the results of sensing actions of the crank angle sensing apparatus and the intake pipe pressure sensing apparatus.

15. The internal combustion engine control system according to claim 13, further comprising:
apparatus configured to one of sense and estimate crank angles of the internal combustion engine, and
apparatus configured to one of sense and estimate pressure in an intake pipe of the internal combustion engine;
wherein the continuously or gradually varying apparatus controls intake valve opening timing on the basis of the results of sensing actions of the crank angle sensing apparatus and the intake pipe pressure sensing apparatus.

16. The internal combustion engine control system according to claim 12, further comprising apparatus configured to one of sense and estimate stepping-on measurement of an accelerator pedal, wherein
the continuously or gradually varying apparatus is configured to set the lift of the intake valve of the internal combustion engine at a fixed value and to set intake valve opening period at a predetermined period with an accelerator pedal stepping-on measurement being not greater than a predetermined value, and to control air quantity to be sucked by the internal combustion engine by varying intake valve opening timing.

17. The internal combustion engine control system according to claim 12, further comprising apparatus configured to one of sense and estimate temperature of a catalyst disposed in an exhaust passage of the internal combustion engine,
wherein, when the temperature of the catalyst is not higher than a predetermined value, the continuously or gradually varying apparatus is configured to open the exhaust valve of the internal combustion engine at a time earlier than a time when the exhaust valve is opened and the temperature of the catalyst is higher than the predetermined value.

18. An internal combustion engine control system for controlling an internal combustion engine, comprising:
apparatus configured to control fuel injection quantity to be injected by a fuel injection system for directly injecting fuel into a combustion chamber of the internal combustion engine, and to control fuel injection timing whereby stable combustion is effected; and
apparatus configured to vary one of continuously and gradually at least one of opening timing, closing timing and lift of one of an intake valve and an exhaust valve for sealing up the combustion chamber of the internal combustion engine and to reduce engine pumping loss at low load operation and enhance engine power output at high speed operation,
wherein the fuel injection control apparatus is configured to control at least one of fuel injection quantity and fuel injection timing on the basis of a value of a controlled variable provided by the continuously or gradually varying apparatus.

19. The internal combustion engine control system according to claim 18, further comprising a supercharger disposed in an intake passage of the internal combustion engine.

20. The internal combustion engine control system according to claim 18, further comprising apparatus configured to one of sense and estimate knocking in the internal combustion engine, wherein the continuously or gradually varying apparatus controls at least one of valve opening timing, valve closing timing and valve lift of the intake valve continuously or gradually on the basis of the result of sensing action of the knocking determination apparatus to control compression ratio of the internal combustion engine.

21. The internal combustion engine control system according to claim 18, further comprising:

apparatus configured to one of sense and estimate crank angles of the internal combustion engine, and apparatus configured to one of sense and estimate pressure in an intake pipe of the internal combustion engine, wherein the continuously or gradually varying apparatus controls intake valve opening timing on the basis of sensed or estimates of crank angles and intake pipe pressure.

22. The internal combustion engine control system according to claim 18, further comprising apparatus configured to sense or estimate temperature of a catalyst disposed in an exhaust passage of the internal combustion engine, wherein, when the temperature of the catalyst is not higher than a predetermined value, the continuously or gradually varying apparatus is configured to open the exhaust valve of the internal combustion engine at a time earlier than a time when the exhaust valve is opened and the temperature of the catalyst is higher than the predetermined value.

* * * * *